United States Patent

Kobayashi et al.

[11] Patent Number: 5,957,361
[45] Date of Patent: Sep. 28, 1999

[54] MAGNETIC TAPE DEVICE HAVING A TAPE GUIDE WHICH PREVENTS EXCESSIVE COMPRESSIVE FORCE ON A MAGNETIC TAPE

[75] Inventors: Masayoshi Kobayashi, Machida; Tsuneyoshi Oohara, Kawasaki, both of Japan

[73] Assignee: Fujitsu Limited, Kawasaki, Japan

[21] Appl. No.: 09/026,691

[22] Filed: Feb. 20, 1998

[30] Foreign Application Priority Data

Jun. 18, 1997 [JP] Japan .................................. 9-161170

[51] Int. Cl.$^6$ ..................... B65H 20/00; B65H 57/14; G03B 23/02
[52] U.S. Cl. .................. 226/189; 226/194; 242/346.2; 242/615.2; 242/615.3; 242/615.4
[58] Field of Search .................... 242/615.2, 615.3, 242/615.4, 346.2, 358; 226/189, 194

[56] References Cited

U.S. PATENT DOCUMENTS

| | | | |
|---|---|---|---|
| 3,276,651 | 10/1966 | Bryer | 242/615.3 X |
| 3,735,940 | 5/1973 | Schwartz | 242/615.2 X |
| 3,991,956 | 11/1976 | Machida | 242/615.2 X |
| 4,267,951 | 5/1981 | Grant et al. | 242/615.4 X |
| 4,403,720 | 9/1983 | Grant | 242/615.2 X |
| 4,573,619 | 3/1986 | Grant | 242/615.2 X |
| 4,697,759 | 10/1987 | Henderson et al. | 242/615.2 X |
| 5,546,259 | 8/1996 | Iwata et al. | 242/615.3 X |

FOREIGN PATENT DOCUMENTS 6-60496  3/1994  Japan .

OTHER PUBLICATIONS

Patent Abstracts of Japan, No. 06060496, published Mar. 4, 1994.

*Primary Examiner*—Michael R. Mansen
*Attorney, Agent, or Firm*—Staas & Halsey, LLP

[57] ABSTRACT

A magnetic tape device including a tape guide to guide a magnetic tape as the magnetic tape travels past a magnetic head to provide good contact between the magnetic tape and the magnetic head. The tape guide includes a roller guides, or roller guides and guide posts. The roller guide includes upper and lower flange units in sliding contact with the edges of the magnetic tape, and a roller unit between the upper and lower flange unit having the magnetic tape wrapped on an outer circumferential surface. The upper and lower flange units include concave portions disposed in an upper surface of the lower flange unit, and in a lower surface of the upper flange unit, to avoid sliding contact with the edge of the magnetic tape. The concave portions are positioned in the upper and lower flange units such that the upper and lower edges of the magnetic tape contact the upper and lower flange units only at a portion corresponding to the portion of the magnetic tape contacting the outer circumferential surface of the roller unit. The guide post also includes upper and lower flange units having concave portions to avoid sliding contact. Furthermore, the lower flange unit of the roller guide and the lower flange unit of the guide post may be the same member.

34 Claims, 10 Drawing Sheets

MAGNETIC TAPE DEVICE HAVING A TAPE GUIDE WHICH PREVENTS EXCESSIVE COMPRESSIVE FORCE ON A MAGNETIC TAPE

BACKGROUND OF THE INVENTION

1. Field of the Invention

The present invention relates to a magnetic tape device including a roller guide to guide a magnetic tape as the magnetic tape travels past a magnetic head to perform reading/writing of data with respect to the magnetic tape. The roller guide comprises a shaft mountable on a base; an upper flange unit disposed in an upper portion of the shaft and moveable in an up and down direction, the upper flange unit having a lower surface in sliding contact with an upper edge of the magnetic tape; a coil spring to urge the upper flange unit downward; a lower flange unit disposed in a lower portion of the shaft, the lower flange unit having an upper surface in sliding contact with a lower edge of the magnetic tape; and a roller unit having the magnetic tape wrapped on an outer circumferential surface, wherein the roller unit is coaxial with the shaft between the upper flange unit and the lower flange unit, and rotates accompanying to the travel of the magnetic tape.

Moreover, the present invention relates to a magnetic tape device including a tape guide having a roller guide and a guide post to guide a magnetic tape as the magnetic tape travels past a magnetic head to perform reading/writing of data with respect to the magnetic tape. The roller guide comprises a shaft; an upper flange unit disposed on an upper portion of the shaft, the upper flange unit having a lower surface in sliding contact with an upper edge of the magnetic tape; a lower flange unit disposed on a lower portion of the shaft, the lower flange unit having an upper surface in sliding contact with a lower edge of the magnetic tape; and a roller unit having the magnetic tape wrapped around an outer circumference, wherein the roller unit is coaxial with the shaft between the upper flange unit and the lower flange unit, and rotates accompanying the travel of the magnetic tape. The guide post comprises an upper flange unit disposed on an upper portion of the shaft, the upper flange unit having a lower surface in sliding contact with an upper edge of the magnetic tape; a lower flange unit disposed on a lower portion of the shaft, the lower flange unit having an upper surface in sliding contact with a lower edge of the magnetic tape; and a sliding contact portion having the magnetic tape wrapped around an outer circumferential surface located coaxially with the shaft between the upper flange unit and the lower flange unit and in sliding contact with the magnetic tape.

2. Description of the Related Art

A conventional magnetic tape device performs reading of data from a magnetic tape and writing of data to the magnetic tape with a magnetic head as the magnetic tape travels past the magnetic head. The magnetic tape is guided as it travels by a tape guide consisting of roller guides, or consisting of roller guides and guide posts.

FIG. 15 is a cross sectional diagram of a roller guide used in a prior art magnetic tape device. As shown in FIG. 15, the roller guide consists of a cylindrical shaft 1 set up on a base (not shown). The cylindrical shaft 1 includes a large diameter portion 1A integrally formed in a lower portion of the shaft 1. A lower flange unit 3, made of ceramic or the like, is integrally adhered to an upper surface of the large diameter portion 1A. An upper surface of the lower flange unit 3 is formed as a flat surface, and the lower edge of the magnetic tape is in sliding contact with the upper surface of the lower flange unit 3. Furthermore, a convex portion 1B is formed in a lower end of the shaft 1, and a screw hole 1C is formed in a lower surface of the convex portion 1B for fixing the roller guide to the base.

A roller portion 6 having a cylindrical form is supported, coaxially with the center portion of the shaft 1, by an upper bearing 4 and a lower bearing 5. The roller portion 6 rotates with the magnetic tape in contact with its outer circumferential surface.

Moreover, an upper flange unit 8 is disposed on an upper portion of the shaft 1 fitted to a holder 7 having a flanged cylindrical form, and is movable in the shaft direction (up and down direction). More particularly, as shown in FIG. 15, the holder 7 is fitted to the upper portion of the shaft 1, and the upper flange unit 8 is fitted to the cylindrical portion of the holder 7 such that the upper flange unit 8 is movable in the shaft direction. A lower surface of the upper flange unit 8 is formed as a flat surface, and the upper edge of the magnetic tape is in sliding contact with the lower surface of the upper flange unit 8. Furthermore, a cap 10 is fixed to the upper end surface of the shaft 1 with a small flat head screw (bolt) 9.

A compression coil spring 11 is inserted between an inner ring of the upper bearing 4 and the holder 7. A ring 12 is located between an inner ring of the lower bearing 5 and a step portion of the shaft 1. The action of the compression coil spring 11 takes up the play of the upper and lower bearings 4, 5 in the shaft direction, thereby taking up the play of the roller 6 in the up and down direction.

A compression coil spring 13 is also inserted between the upper flange unit 8 and the cap 10. The action of the compression coil spring 13 urges the upper flange unit 8 toward the lower flange unit 3, and the magnetic tape which travels between the upper flange unit 8 and the lower flange unit 3 is normally pressed against the lower flange unit 3. Accordingly, the magnetic tape travels while the upper and lower edges of the magnetic tape are in sliding contact with the lower surface of the upper flange unit 8 and the upper surface of the lower flange unit 3, respectively. Moreover, the travel height of the magnetic tape is determined by the position (height) of the lower flange unit 3.

FIG. 16 is a diagram showing a prior art magnetic head assembly including a roller guide having the construction shown in FIG. 15. As shown in FIG. 16, roller guides 21, 22 are positioned in a line on a base 23 in a direction of travel of the magnetic tape. The roller guides 21, 22 include lower flange units 21A, 22A, respectively. Step holes 23A, 23B are drilled in the base 23, and the convex portions (corresponding to 1B in FIG. 15) of the roller guides 21, 22 are fitted into the step holes 23A, 23B, respectively. After the convex portions are fitted into step holes 23A, 23B, small screws (bolts) 24A, 24B are screwed into screw holes (corresponding to 1C in FIG. 15) from below, thereby fixing the respective roller guides 21, 22 to the base 23.

A magnetic head assembly 25 is fixed to the base between the roller guides 21, 22 with small screws (bolts) 26. As shown in FIG. 16, the magnetic head assembly 25 includes a magnetic head having a read gap GR and a write gap GW, and a plurality of heads whose number is optionally selected (for example, twenty-four) to perform reading/writing of the magnetic tape. More specifically, the magnetic head assembly 25 includes a plurality of playback head portions 27 and recording head portions 28, each corresponding to a track of the magnetic tape.

Japanese Laid-Open Patent Publication JP-A-6-60496 discloses a prior art magnetic tape device having a roller guide which is different from the roller guide shown in FIG. 15. More particularly, the magnetic tape device disclosed in Japanese Laid-Open Patent publication JP-A-6-60496 includes a roller guide having an upper flange unit and a lower flange unit having a spacing between a lower edge of the upper flange unit and an upper edge of a lower flange unit which is different when recording and playing back the magnetic tape, in comparison with when rewinding the magnetic tape. In the case of recording and playing back the magnetic tape, the spacing of the lower edge of the upper flange unit and the upper edge of the lower flange unit is narrow and the control of the height of the magnetic tape is accurately performed. In the case of rewinding the magnetic tape, the spacing is wide because the up and down movement of the magnetic tape is large during high speed travel of the magnetic tape, and the magnetic tape is exposed to excessive compressive forces.

More particularly, to make the spacing of the lower surface of the upper flange unit and the upper surface of the lower flange unit large in a fixed angular range, a guide surface having a difference in level of a top surface and a bottom surface is formed in the lower surface of the upper flange unit. By rotating the whole roller guide by a predetermined angle, the edge of the magnetic tape can be selectively placed in sliding contact with the higher or lower guide surface.

The above-described conventional magnetic tape devices relate to guiding a magnetic tape using roller guides only. However, magnetic tape devices are known wherein the magnetic tape travels while guided by a tape guide consisting of roller guides and guide posts. The roller guide used in the magnetic tape device having a tape guide consisting of roller guides and guide posts may be the same as the roller guide described above with respect to FIG. 15. Alternatively, the roller guide may be similar to the roller guide shown in FIG. 15, while eliminating the up and down movement mechanism portion of the upper flange unit, the urging action of the coil spring 13, and the like.

The guide post used in the conventional tape guide generally consists of an upper flange unit disposed in an upper portion of the shaft, the upper flange unit having a lower surface in sliding contact with the upper edge of the magnetic tape, and a lower flange unit disposed in a lower portion of the shaft, the lower flange unit having an upper surface in sliding contact with the lower edge of the magnetic tape. A sliding contact portion coaxial with the shaft and located between the upper flange unit and the lower flange unit makes sliding contact with a magnetic tape wrapped on its outer circumferential surface. The lower flange unit of the roller guide and the lower flange unit of the tape guide are separate members.

FIG. 17 is a schematic diagram illustrating the sliding contact state of the magnetic tape T and the lower flange unit 3 in the roller guide shown in FIG. 15. As shown in FIG. 17, the lower edge of the magnetic tape T is in a state of contact with an outer circumferential surface of the roller unit 6 in a wrap portion $L_1$, which corresponds to a region of the angle of wrap $\theta_1$. Further, the magnetic tape T is in sliding contact with the upper surface of the lower flange unit 3 in the wrap portion $L_1$ and in non-wrap portions $L_2$, $L_3$, which correspond to the respective regions of the angles of wrap $\theta_2$, $\theta_3$.

Similarly, the upper edge of the magnetic tape T is in sliding contact with the lower surface of the upper flange unit 8 in both the wrap portion $L_1$ and in the non-wrap portions $L_2$, $L_3$. The wrap portion $L_1$ of the magnetic tape T does not receive a compressive force in the up and down direction (i.e., a bending direction) from the upper flange unit 8 and the lower flange unit 3 because the wrap portion $L_1$ contacts the outer circumferential surface of the roller unit 6. However, the non-wrap portions $L_2$, $L_3$ of the magnetic tape T receive compressive forces from the upper flange unit 8 and the lower flange unit 3, and the magnetic tape becomes bent because the non-wrap portions $L_2$, $L_3$ are not in contact with the outer circumferential surface of the roller unit 6. The bending of the non-wrap portions $L_2$, $L_3$ causes poor contact (head touch) between the magnetic tape T and the magnetic head and causes reading/writing errors close to the upper and lower tape edges.

When the roller guide disclosed in Japanese Laid-Open Patent Publication JP-A-6-60496 is used during playback and recording, the interval between the lower surface of the upper flange unit and the upper surface of the lower flange unit is narrowed. However, the sliding contact of the upper edge of the magnetic tape T on the lower surface of the upper flange unit, and the sliding contact of the lower edge of the magnetic tape T on the upper surface of the lower flange unit are the same as for the roller guide shown in FIG. 17, not only in the wrap portion but also in the non-wrap portions. As a result, even when using the roller guide disclosed in Japanese Laid-Open Patent Publication JP-A-6-60496, the non-wrap portion of the magnetic tape receives compressive forces from the lower flange unit and upper flange unit in the up and down direction, and becomes bent as a result of these forces. Furthermore, the bending of the magnetic tape causes poor contact between the magnetic tape and the magnetic head close to the upper and lower tape edges, and, as a result, reading/writing errors occur.

Furthermore, in the conventional magnetic tape device having a tape guide consisting of roller guides and guide posts to guide the magnetic tape as the magnetic tape travels, the lower flange unit of the roller guide and the lower flange unit of the guide post are different members. Since the two flange units are different members, a troublesome adjustment is necessary to adjust the height of the upper surface of the two flange units, resulting in an increase in the cost of the device. Furthermore, in practice, accurate adjustment of the height of the two flange units is difficult.

Moreover, since the roller guide and the guide post are located close together, when there is a difference in level between the roller guide and the guide post, an excessive force is applied to the edge of the magnetic tape. As a result of the excessive force applied to the edge of the magnetic tape, the magnetic tape becomes bent, there is poor contact between the magnetic tape and the magnetic head, and reading/writing errors occur close to the upper and lower tape edges.

SUMMARY OF THE INVENTION

It is an object of the present invention to provide a magnetic tape device that overcomes the problems of the prior art and provides good contact between a magnetic tape and a magnetic head.

Another object of the present invention is to provide a magnetic tape device that provides good contact between the magnetic tape and the magnetic head, and at a low cost.

Another object of the present invention is to provide a tape guide, suitable for use in a magnetic tape device, including a roller guide having a roller unit with the tape wrapped on an outer circumferential surface, an upper flange unit and a lower flange unit in sliding contact with the tape, wherein the roller unit is between the upper flange unit and the lower flange unit, and the upper flange unit and lower flange unit include concavities for avoiding sliding contact with portions of the tape which are not in contact with a roller unit of the roller guide.

Objects and advantages of the present invention are achieved in accordance with a first embodiment of the present invention with a magnetic tape device including a roller guide to guide a magnetic tape while the magnetic tape travels past a magnetic head to perform reading/writing of data from/to the magnetic tape. The roller guide comprises a shaft unit mounted on a base; an upper flange unit disposed on an upper part of the shaft unit and movable in an up and down direction, the upper flange unit having a lower surface in sliding contact with an upper edge of the magnetic tape; a coil spring to urge the upper flange unit downward; a lower flange unit disposed on a lower part of the shaft unit and having an upper surface in sliding contact with a lower edge of the magnetic tape; and a roller unit coaxial with the shaft unit and located between the upper flange unit and the lower flange unit, wherein the magnetic tape is wrapped on an outer circumferential surface of the roller unit and the roller unit rotates accompanying the travel of the magnetic tape. Each of the lower surface of the upper flange unit and the upper surface of the lower flange unit include a concavity which avoids sliding contacts the magnetic tape. Thus, the upper flange unit and the lower flange unit are in sliding contact with only the upper and lower edges of a portion of the magnetic tape which is in a state of contact with the outer circumferential surface of the roller unit (i.e., a wrap portion of the magnetic tape).

In accordance with the first embodiment of the present invention, the upper flange unit and the lower flange unit are mounted in a non-rotatable state with respect to the shaft. A convex portion is disposed in a lower end of the shaft, and a flat surface parallel to the central axis of the shaft is formed in the outer circumference of the convex portion. A concave portion is disposed in the base into which the convex portion of the shaft fits. By fitting together the concave portion of the base and the convex portion of the shaft, position setting of the roller guide is easily performed, and the design reduces the cost of the magnetic tape device.

Moreover, in accordance with the first embodiment of the present invention, an engagement portion is disposed in a lower end of the shaft for setting the shaft in the base. Further, an engagement portion is disposed in the base which engages the engagement portion of the shaft. Therefore, the convex portion of the shaft is fitted into the concave portion of the base, and in addition, the engagement portions of the shaft and base are engaged to set the position of the roller guide on the base. Accordingly, the position setting of a roller guide becomes easy, and the design reduces the cost of the magnetic tape device.

In accordance with the first embodiment of the present invention, the magnetic tape device includes a plurality of roller guides respectively having different angles of wrap. However, the first embodiment of the present invention is applicable to a variety of roller guides, regardless of the angle of wrap, including roller guides having large and small angles of wrap. For example, in roller guides having a small angle of wrap, wherein sliding contact with the upper flange unit and the lower flange unit occurs only in the wrap portion of the upper and lower edges of the magnetic tape, an upper flange unit and a lower flange unit in which concavities are formed for avoiding sliding contact can still be used. Accordingly, if a magnetic tape device requires a plurality of tape guides including roller guides having different angles of wrap, the roller guide in accordance with the present invention can be used as a common component in the plurality of tape guides having different angles of wrap, thereby simplifying design and reducing the cost of the magnetic tape device.

Objects and advantages of the invention are achieved in accordance with a second embodiment of the present invention with a magnetic tape device including a tape guide comprising roller guides and guide posts to guide a magnetic tape as the magnetic tape travels past a magnetic head to perform reading/writing of data. The roller guide comprises a roller guide shaft; an upper flange unit disposed on an upper portion of the roller guide shaft in sliding contact with an upper edge of the magnetic tape; a lower flange unit disposed on a lower portion of the roller guide shaft in sliding contact with a lower edge of the magnetic tape; and, a roller unit coaxial with the roller guide shaft and located between the upper flange unit and the lower flange unit, which rotates accompanying the travel of the magnetic tape. The guide post comprises a guide post shaft; an upper flange unit disposed on an upper portion of the guide post shaft having a lower surface in sliding contact with the upper edge of the magnetic tape; a lower flange unit disposed on the lower portion of the guide post shaft having an upper surface in sliding contact with the lower edge of the magnetic tape; and a sliding contact member located between the upper flange unit and the lower flange unit, in sliding contact with the magnetic tape wrapped on an outer circumferential surface, wherein the lower flange unit of the roller guide and the lower flange unit of the guide post are the same member.

In accordance with the second embodiment of the present invention, because the tape guide comprises a roller guide and a guide post having lower flange units which are the same member device is easily assembled, and the cost of the device is reduced.

Furthermore, in accordance with the second embodiment of the present invention, since the height of the respective lower flange units of the roller guide and guide post are coincident, excessive forces are not exerted on the magnetic tape as a result of a difference in level between lower flange units. Still further, since excessive forces are not exerted on the magnetic tape, the magnetic tape does not become bent, and reading and writing errors near the upper and lower edges of the tape, which are caused by poor contact of the magnetic tape and the magnetic head, do not occur.

In accordance with the second embodiment of the present invention, the upper flange unit of at least one of the roller guide and the guide post is mounted for movement in the up and down direction of the shaft and is urged downward with a coil spring. Accordingly, the tape travel height can be kept constant.

Moreover, in accordance with the second embodiment of the present invention, each of the lower surface of the upper flange unit and the upper surface of the lower flange unit of the roller guide include a concavity for avoiding sliding contact, such that the magnetic tape is in sliding contact with the upper flange unit and lower flange unit of the roller guide at only the upper and lower edges of the wrap portion of the magnetic tape which contacts the outer circumferential surface of the roller unit. Further, each of the lower surface of the upper flange unit and the upper surface of the lower flange unit of the guide post include a concavity for avoiding sliding contact, such that the magnetic tape is in sliding contact with the upper flange unit and the lower flange unit of the guide post at only the upper and lower edges of the wrap portion of the magnetic tape which contacts the outer circumferential surface of the guide post. Accordingly, by providing concavities for avoiding sliding contact in each of the lower surface of the upper flange unit and the upper surface of the lower flange unit in both the roller guide and the guide post, the non-wrap portion of the magnetic tape does not receive compressive forces in the up and down direction from the upper flange unit and lower flange unit, and does not bend. Therefore, poor contact of the magnetic tape with the magnetic head as a result of compressive forces is eliminated, and reading/writing errors close to the tape edges do not occur.

Moreover, in accordance with the second embodiment of the present invention, the lower end of the roller guide shaft includes a convex portion for setting the tape guide in the base, and the lower end of the guide post shaft includes a convex portion for setting the tape guide in the base. The base includes a concave portion which fits with the convex portion of the roller guide shaft, and the base includes a concave portion which fits with the convex portion of the guide post shaft. Accordingly, by interfitting of concave portions of the base with the convex portions of the roller guide shaft and guide post shaft, position setting of the tape guide on the base is easily performed, and the design reduces the cost of the magnetic tape device.

In accordance with the second embodiment of the present invention, the magnetic tape device comprises a plurality of tape guides, each including a roller guide and guide post, positioned on the upstream side and the downstream side of the magnetic head to guide the magnetic tape toward the magnetic head. The roller guides and guide posts of the tape guides may have different angles of wrap. For example, in a roller guide with a small angle of wrap, the upper flange unit and the lower flange unit are in sliding contact with the magnetic tape only at the upper and lower tape edges of the wrap portion of the magnetic tape which contacts the outer circumferential surface of the roller unit. However, the second embodiment of the present invention is applicable to a variety of roller guides, regardless of whether the angle of wrap is large or small. More particularly, a tape guide having a roller unit and a guide post with an upper flange unit and lower flange unit each having concavities for avoiding sliding contact can be used with a roller guide having a large angle of wrap and a guide post having a large angle of wrap, as well as with a roller guide having a small angle of wrap and a guide post having a small angle of wrap. Therefore, the tape guide in accordance with the second embodiment of the present invention can be used as a common component in a magnetic tape device, regardless of the angle of wrap, thereby simplifying design and reducing the cost of the magnetic tape device.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
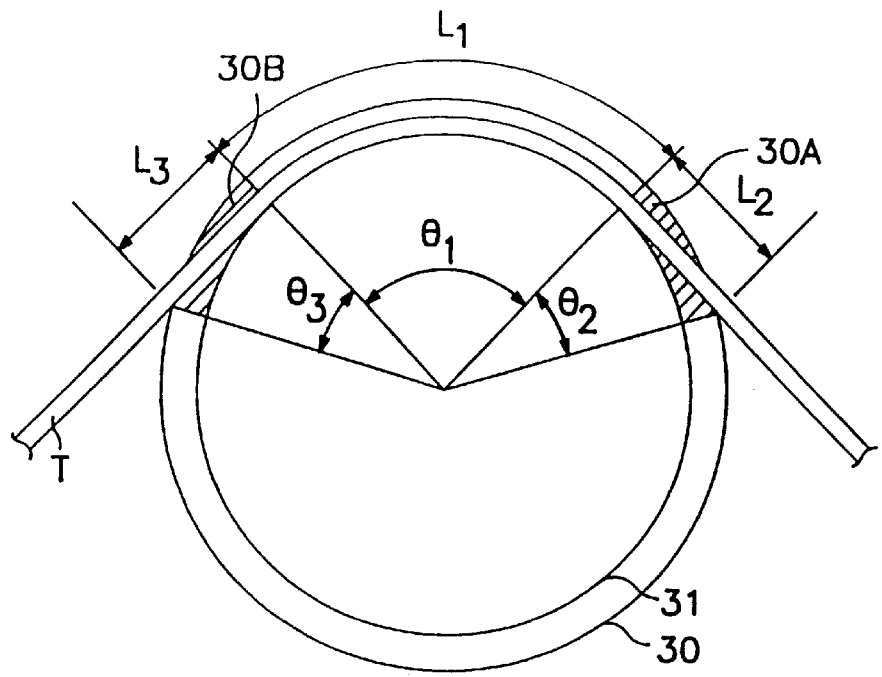
FIG. 1 is a diagram of a roller unit in accordance with a first embodiment of the present invention.

Reference will now be made in detail to the preferred embodiments of the present invention, examples of which are illustrated in the accompanying drawings, wherein like reference numerals refer to like elements throughout.

FIG. 1 is a diagram illustrating a sliding contact state of a magnetic tape and a roller guide in accordance with the first embodiment of the present invention. The general principles of embodiments of the present invention will first be described below with reference to FIG. 1. As shown in FIG. 1, the magnetic tape T is wrapped around a roller unit 31 such that the lower edge of the magnetic tape T contacts an outer circumferential surface of the roller unit 31 only in a portion $L_1$, corresponding to a range of angle of wrap $\theta_1$. The portion $L_1$ of the magnetic tape T is in sliding contact with an upper surface of a lower flange unit 30. The portions L2, $L_3$ of the magnetic tape T (i.e., the non-wrap portions) are not in contact with the outer circumferential surface of the roller unit 31.

Figure 17:
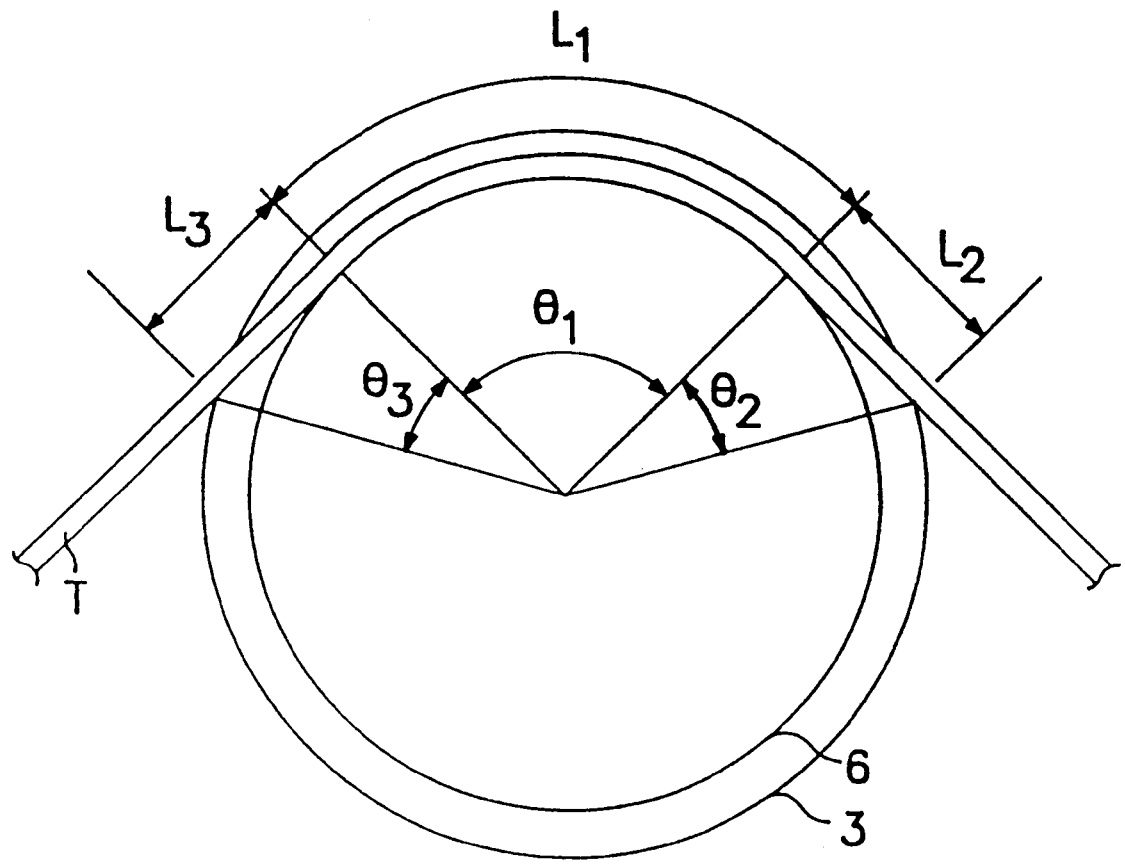
FIG. 17 is a diagram showing the sliding contact state of a magnetic tape and a lower flange unit in the prior art roller guide shown in FIG. 15.

The lower flange unit 30 includes concavities 30A, 30B (represented by hatching) in the portions of the lower flange unit 30 corresponding to the non-wrap portions $L_2$, $L_3$ in the range of angles $\theta_2$, $\theta_3$, respectively, which non-wrap portions $L_2$, $L_3$ are in sliding contact with the upper surface of the prior art lower flange unit 3 shown in FIG. 17. The concavities 30A, 30B avoid sliding contact of the magnetic tape with the upper surface of the lower flange unit 30 at the positions corresponding to non-wrap portions $L_2$, $L_3$.

Further, an upper flange unit (not shown in the drawing) also includes concavities for avoiding sliding contact. More particularly, the upper flange unit includes concavities in the portions of the upper flange unit corresponding to the non-wrap portions $L_2$, $L_3$, which non-wrap portions $L_2$, $L_3$ were in sliding contact with the lower surface of the prior art upper flange unit.

Furthermore, as described above, with respect to the portions of the upper and lower edges of the magnetic tape which are in sliding contact with the lower surface of the upper flange unit and the upper surface of the lower flange unit, respectively, only the wrap portion $L_1$ (a portion of the region of angle of wrap $\theta_1$) contacts the outer circumferential surface of the roller unit 31. Because of this, the concavities 30A, 30B for avoiding sliding contact, which are formed in the lower surface of the upper flange unit and the upper surface of the lower flange unit, are formed extending in a direction which encroaches on the wrap portion $L_1$. However, the range in the length direction of the magnetic tape of sliding contact of the lower and upper edges of the magnetic tape T with the upper surface of the lower flange unit and the lower surface of the upper flange unit, respectively, may be shorter than the wrap portion $L_1$.

However, to optimize tape travel, it is advantageous to make the range of sliding contact in the length direction of the upper and lower edges of the magnetic tape T with the lower surface of the upper flange unit and the upper surface of the lower flange unit, respectively, maximally long. Specifically, to optimize tape travel, the range of sliding contact is made equal to the wrap portion $L_1$. Moreover, the concavity for avoiding sliding contact may be prolonged in a reverse direction to the above-described direction, namely the reverse direction to the wrap portion $L_1$.

In accordance with the first embodiment of the present invention, the non-wrap portions $L_2$, $L_3$ of the magnetic tape T do not receive compressive forces in the up and down direction from the upper flange unit or the lower flange unit, and therefore the non-wrap portions $L_2$, $L_3$ do not bend. Further, since the magnetic tape does not receive compressive forces in the non-wrap portions $L_2$, $L_3$, reading and writing errors near the upper and lower edges of the magnetic tape, caused by poor contact of the magnetic tape T and the magnetic head, do not occur.

Figure 2:
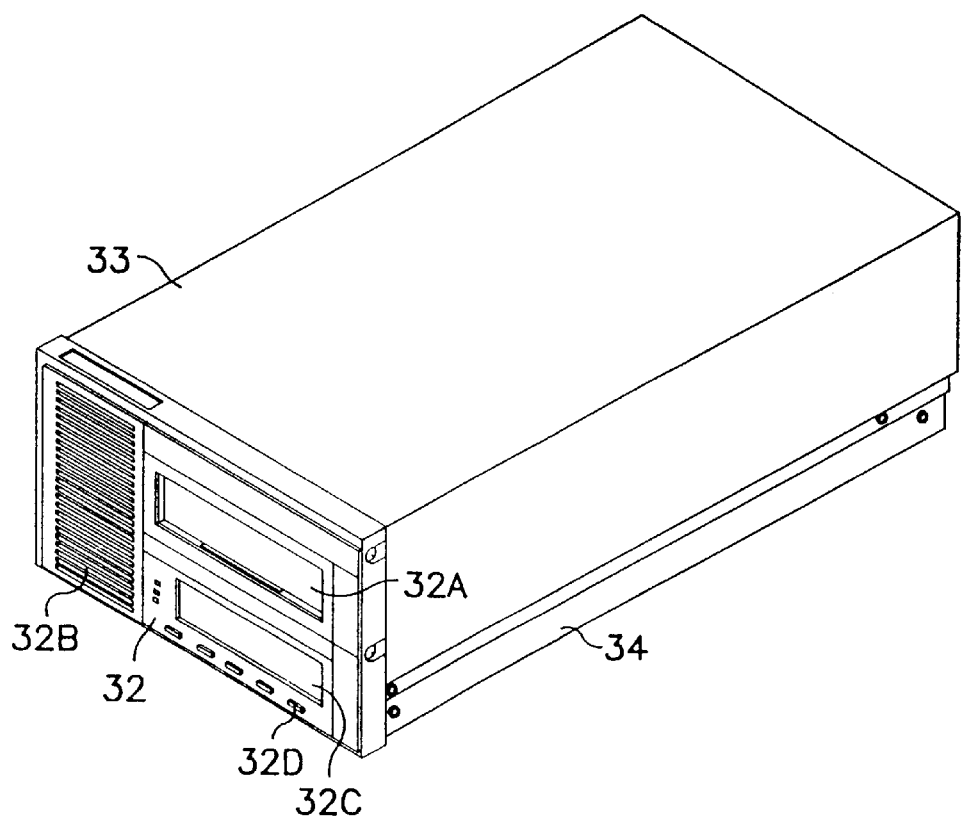
FIG. 2 is a diagram showing an external appearance of a magnetic tape device in accordance with the first embodiment of the present invention.
Figure 3:
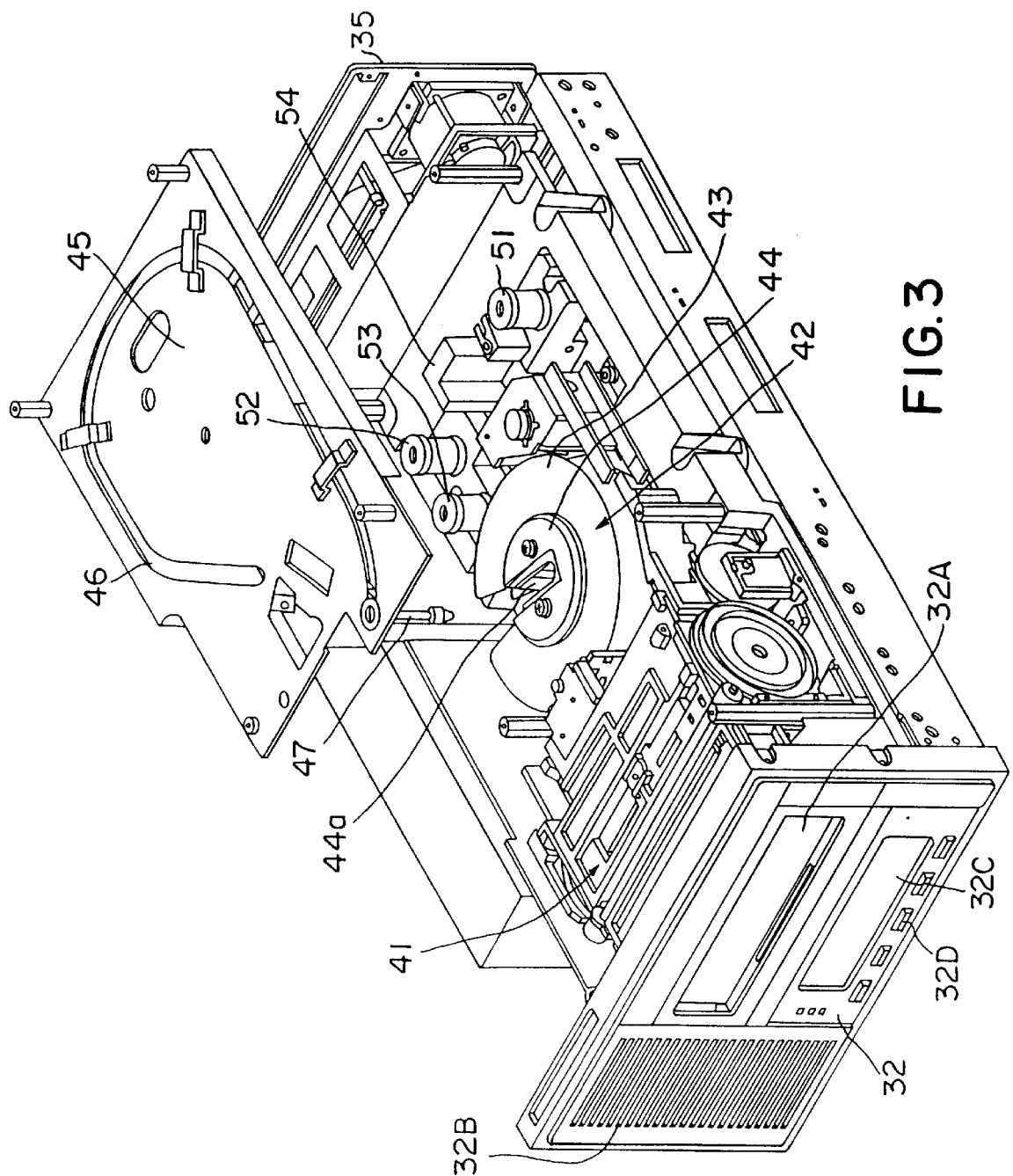
FIG. 3 is an exploded oblique view of the magnetic tape device shown in FIG. 1 seen from the front upper side with the top cover removed in accordance with the first embodiment of the present invention.

A magnetic tape device in accordance with the first embodiment of the present invention will be described below with reference to FIGS. 2 and 3. FIG. 2 is a diagram showing an external appearance of a magnetic tape device in accordance with the first embodiment of the present invention. FIG. 3 is an exploded oblique view of the magnetic tape device shown in FIG. 1 seen from the front side with the top cover (i.e., a roof plate and a side plate) removed in accordance with the first embodiment of the present invention.

As shown in FIGS. 2 and 3, the magnetic tape device in accordance with the first embodiment of the invention is enclosed by a housing comprising a front panel 32, a top cover 33 including a roof plate and a side plate, a bottom plate 34, and a back plate 35. The front panel 32 includes a cartridge insertion aperture 32A, a grille aperture 32B for cooling purposes, a display unit 32C, and actuating units 32D disposed therein.

The magnetic tape device shown in FIGS. 2 and 3 in accordance with the first embodiment of the present invention comprises various components internal to the housing including roller guides and their peripheral components. More particularly, the magnetic tape device comprises a mechanism to extract a magnetic tape from a loaded cartridge and to perform reading and writing of the magnetic tape. The mechanism for extracting the magnetic tape from the cartridge is similar to that of the magnetic tape device generally known in the prior art. The components of the magnetic tape device, with the exception of the roller guides and their peripheral components, will first be briefly described below.

The magnetic tape is wound up within a cartridge (not shown), and a leader block is mounted on the end of the magnetic tape. The cartridge is inserted into the magnetic tape device through the cartridge insertion aperture 32A. A guide unit 41 in the interior of the cartridge insertion aperture 32A sets the inserted cartridge in a predetermined position, and discharges the cartridge.

After the cartridge is inserted into the magnetic tape device, the magnetic tape is wrapped around magnetic tape roller guides 51, 52 and 53 with a machine reel unit 42 and a threader unit 45. The machine reel unit 42 includes a hub 44 having a leader block fitting groove 44a. The threader unit 45 includes a threader pin 47 which slides along a groove 46. When the cartridge is inserted, the threader pin 47 engages the leader block along the groove 46 to fit the leader block into the groove 44a of the hub 44. The magnetic tape is thereby wrapped on magnetic tape roller guides 51, 52 and 53, and is stopped on the hub 44 by the threader pin 47. A magnetic head assembly 54 is positioned between the roller guides 51 and 52, and performs reading and writing of data with respect to the magnetic tape.

Figure 4:
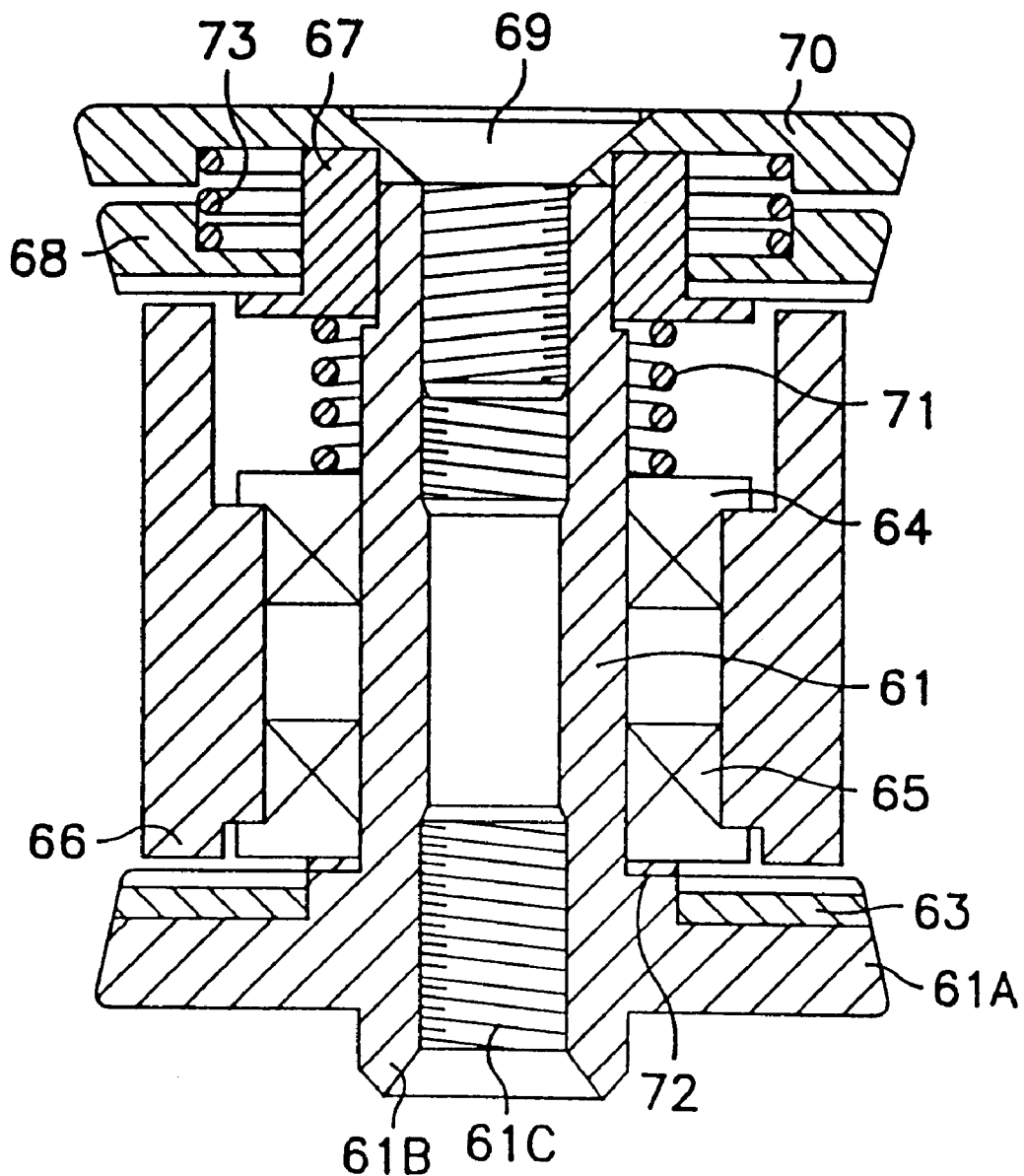
FIG. 4 is a cross sectional diagram of a roller guide shown in FIG. 3 in accordance with the first embodiment of the present invention.

The roller guides 51–53 and the magnetic head assembly 54 will now be described in more detail below with reference to FIG. 4. FIG. 4 is a cross sectional diagram of the roller guides 51–53 shown in FIG. 3 in accordance with the first embodiment of the present invention. More specifically, FIG. 4 illustrates a cross section of the roller guides taken through a concavity in a lower flange unit 63 to avoid sliding contact. Further, each of the roller guides 51–53 comprise the same components.

As shown in FIG. 4, the roller guides 51–53 comprise a cylindrical shaft 61, mountable on a base (not shown in the drawing). The cylindrical shaft 61 is preferably made of a stainless steel material having excellent workability. However, the cylindrical shaft may be made of other suitable materials. A large diameter portion 61A is integrally formed at a lower end of the shaft 61. A lower flange unit 63 is integrally affixed to a top surface of the large diameter portion 61A. The lower flange unit 63 is preferably made of ceramic or the like. Furthermore, a convex portion 61B is formed in a lower portion of the shaft 61 and a screw hole 61C forms an aperture in the lower surface of the convex portion 61B of the shaft 61. The screw hole 61C is used to receive a screw when fixing the roller guides 51–53 to the base.

Figure 5:
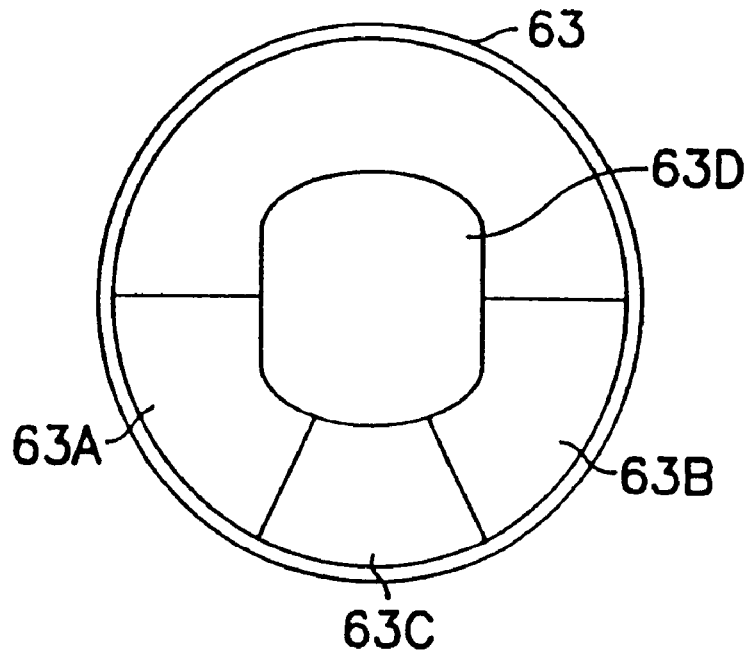
FIG. 5 is a diagram showing an upper surface of a lower flange unit shown in FIG. 3 in accordance with the first embodiment of the present invention.
Figure 6:
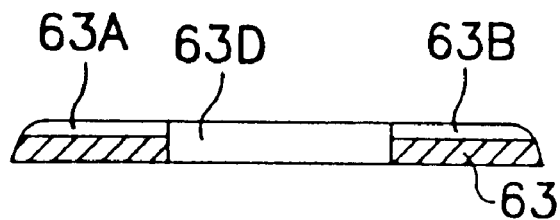
FIG. 6 is a cross sectional diagram of the lower flange unit shown in FIG. 3 in accordance with the first embodiment of the present invention.

FIGS. 5 and 6 illustrate an upper surface and a cross-sectional view, respectively, of the lower flange unit 63 in accordance with the first embodiment of the present invention. The lower flange unit 63 is formed such that the lower flange unit is in sliding contact with the lower edge of the magnetic tape only in a wrap portion of a magnetic tape which contacts the outer circumferential surface of a cylindrical roller 66 (FIG. 4). The portion of the magnetic tape which contacts the outer circumferential surface of the roller 66 is referred to as a wrap portion. The upper surface of the lower flange unit 63 includes concavities 63A, 63B for avoiding sliding contact with a portion of the lower flange unit 63 which risks contact with the non-wrapped portion of the lower edge of the magnetic tape. Further, the lower flange unit 63 includes a convex region 63C in sliding contact with only the wrap portion of the magnetic tape.

A through hole 63D having a small radius is perforated in a center of the lower flange unit 63 through which the shaft 61 fits. The shape of the through hole 63D allows the position of the lower flange unit 63 with respect to the shaft 61 to be easily set. The portion of the shaft 61 which fits into the through hole 63D is, of course, also of small diameter.

The convex portion 61B of the shaft 61 has a small diameter cross section which is inserted into the base to set the position in a rotation direction of the roller guide on the base. A concave portion having a small cross section corresponding to the cross section of the convex portion 61B is disposed in the base, into which fits the convex portion 61B of the shaft 61.

As shown in FIG. 4, the cylindrical roller 66, which rotates with the magnetic tape in contact with the external circumference, is supported coaxially with the shaft 61 in an intermediate portion of the shaft 61 by an upper bearing 64 and a lower bearing 65. Moreover, an upper flange unit 68 is disposed in the upper portion of the shaft 61, fitted around a flanged tubular holder 67. The upper flange unit 68 is movable only in the shaft direction (i.e., an up and down direction). More particularly, the flanged tubular holder 67 is fitted on the upper portion of the shaft 61 and is movable only in the up and down direction. The upper flange unit 68 is fitted in a tubular portion of the flanged tubular holder 67, and is movable only in the up and down direction. The upper portion of the shaft 61 is formed with a small diameter cross section, and a through hole of the flanged tubular holder 67, which fits on the shaft 61, is also formed with a small diameter.

Figure 7:
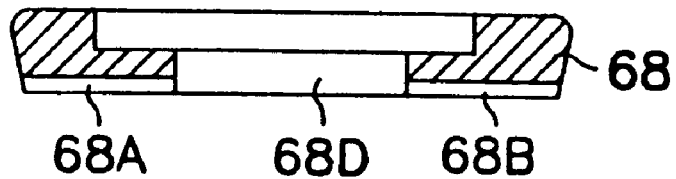
FIG. 7 is a cross sectional diagram of an upper flange unit shown in FIG. 3 in accordance with the first embodiment of the present invention.
Figure 8:
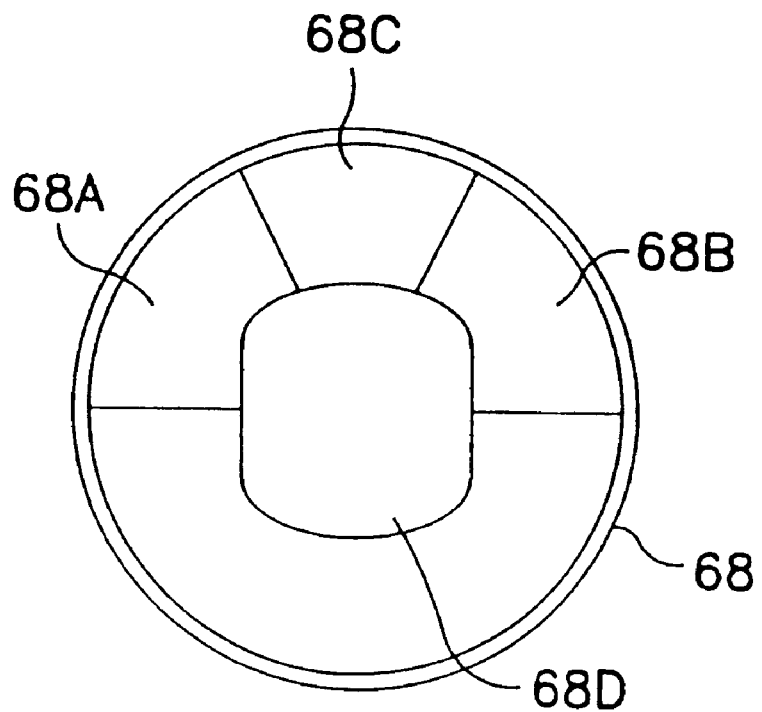
FIG. 8 is a diagram of a lower surface of the upper flange unit shown in FIG. 3 in accordance with the first embodiment of the present invention.

FIGS. 7 and 8 are a cross-sectional diagram of the upper flange unit 68 and a diagram of a lower surface of the upper flange unit 68, respectively, in accordance with the first embodiment of the invention. As shown in FIGS. 7 and 8, a small diameter through hole 68D is perforated in the center of the upper flange unit 68. Further, a tubular portion of the flanged tubular holder 67 which fits with the through hole 68D is also formed with a small diameter cross section. The upper flange unit 68 is formed such that the upper flange unit 68 is in sliding contact with the upper edge of the magnetic tape only in the portion contacting the outer circumferential surface of the cylindrical roller 66 (i.e., the wrap portion). More particularly, the lower surface of the upper flange unit 68 includes concavities 68A, 68B for avoiding sliding contact disposed in a portion of the flange unit 68 which is at risk of contacting a non-wrap portion of the magnetic tape. Further, the upper flange unit 68 includes a convex region 68C in sliding contact with only the wrap portion of the magnetic tape.

The range of sliding contact of the convex regions of the lower and upper flange units 63C, 68C with the magnetic tape is chosen to be the same length as the wrap portion of the magnetic tape, thereby making the convex regions 63C, 68C the maximum limiting length in order to bring about stability of tape travel of the magnetic tape.

A cap 70 is fixed to an upper end surface of the shaft 61, using a small flat head screw (bolt) 69. Moreover, a compression coil spring 71 is inserted between an inner ring of the upper bearing 64 and the flanged tubular holder 67, and a ring 72 is located between an inner ring of the lower bearing 65 and the shaft 61. The play of the upper and lower bearings 64, 65 in the shaft direction is taken up by the movement of the compression coil spring 71, thereby taking up the play of the roller unit 66 in the up and down directions.

A compression coil spring 73 is also inserted between the upper flange unit 68 and the cap 70. The movement of the compression coil spring 73 urges the upper flange unit 68 toward the lower flange unit 63. A magnetic tape which travels between the upper flange unit 68 and the lower flange unit 63 normally presses against the upper surface of the lower flange unit 63. Consequently, the travel height of the magnetic tape is determined by the position (height) of the lower flange unit 63.

Figure 9:
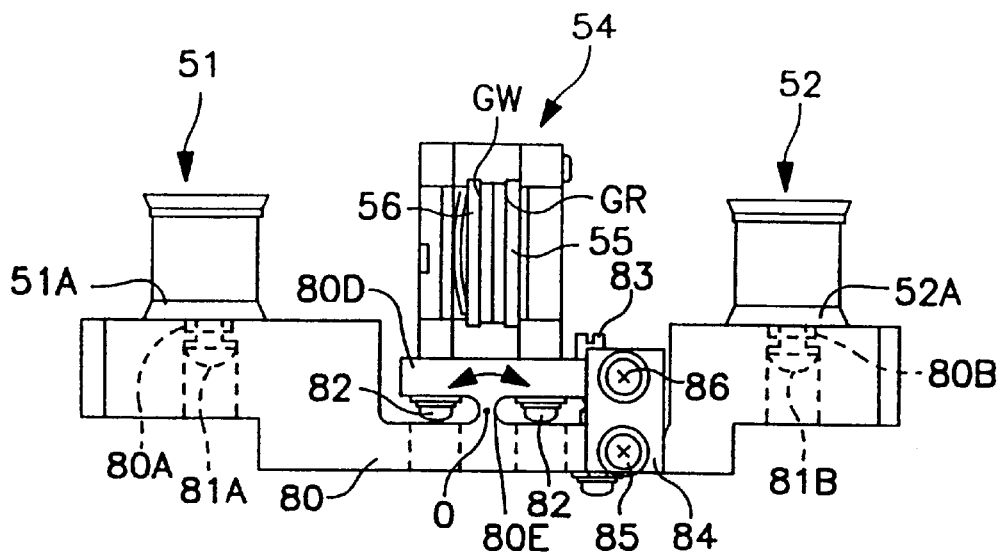
FIG. 9 is a diagram showing an example of the location of a magnetic head assembly and the roller guide shown in FIG. 3 in accordance with the first embodiment of the present invention.
Figure 10:
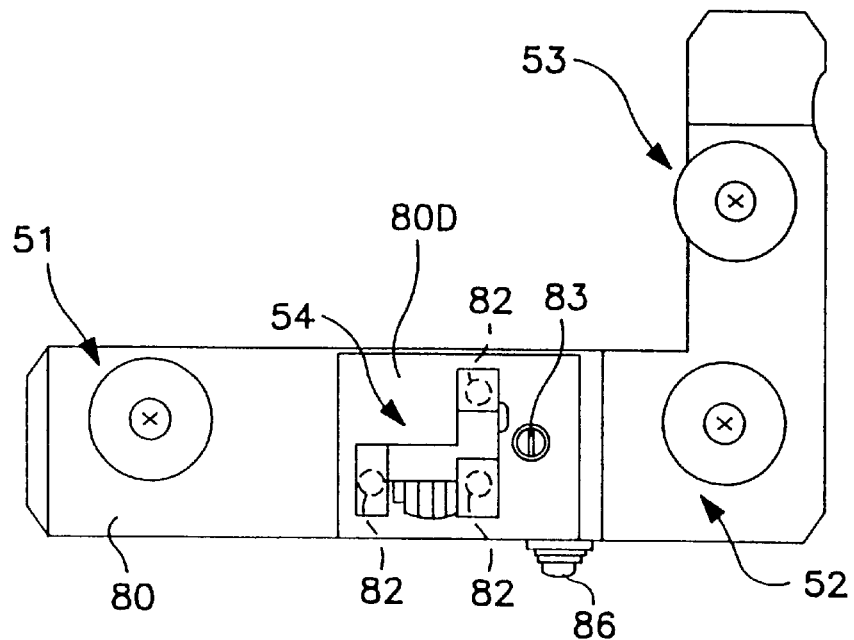
FIG. 10 is a plan view of the magnetic head assembly and roller guide shown in FIG. 9 in accordance with the first embodiment of the present invention.

FIG. 9 is a diagram showing an example of the location of the roller guides 51–53 and a magnetic head assembly 54 in accordance with the first embodiment of the present invention. FIG. 10 is a plan view of the example shown in FIG. 9. As shown in FIGS. 9 and 10, the roller guides 51–53 are located at fixed intervals on a base 80, and include lower flange portions 51A, 52A. The lower flange portion corresponding to roller guide 53 is not showing in the drawing. Specifically, the convex portions (corresponding to 61B in FIG. 4) of the roller guides 51–53 are inserted in step holes 80A, 80B, in the base 80. The step hole corresponding to the roller guide 53 is not shown in the drawing. After the convex portions are fitted in the step holes 80A, 80B, small screws (bolts) 81A, 81B are inserted from below into screw holes (corresponding to 61C in FIG. 4), thereby fixing the roller guides 51–53 to the base 80. The small screw corresponding to the roller guide 53 is not shown in the drawing.

The magnetic base assembly 54 is fixed by three small screws (bolts) 82 to a head mount 80D positioned between the roller guides 51 and 52 on the base 80. A lower side of the base mount 80D is cut away to the left and the right, leaving a central support portion 80E on the lower side of the base mount 80D. The base mount 80D is centered on a shaft through the point O in FIG. 9, and is able to tilt in the directions of the arrow in FIG. 9.

An adjustment screw 83 is threaded to the body of the base 80 and to the base mount 80D to adjust the angle of inclination of the base mount 80D. The adjusting screw 83 includes a male screw portion in screw engagement with the body of the base 80 and a male screw portion in screw engagement with the base mount 80D, with an intermediate constriction as a boundary between the screw portions. The male screw portion in screw engagement with the body of the base 80 has a screw pitch different from the male screw portion in screw engagement with the base mount 80D. Accordingly, by rotating the adjusting screw 83, the inclined portion of the base mount 80D can be adjusted.

After the inclined position of the base mount 80D is adjusted, the base mount 80D is fixed with a plate 84 by tightening small screws 85, 86 in the base body 80 and in the base mount 80D, respectively. Moreover, large diameter holes or slotted holes are formed in the plate 84 as through holes for inserting the small screws 85, 86. The large diameter holes or slotted holes can accommodate a change of spacing of the small screws 85, 86.

The magnetic head assembly 54 includes a magnetic head having a read gap GR and a write gap GW, and can optionally perform reading/writing by selecting a plurality of tracks (for example, twenty four tracks). More particularly, the magnetic head assembly includes a plurality of playback head units 55 and a plurality of recording head units 56 corresponding to each track.

The operation of the magnetic tape device in accordance with the first embodiment of the present invention will now be described below. Firstly, a cartridge is inserted in the guide unit 41 via the cartridge insertion aperture 32A. The threader pin 47 of the threader unit 45 picks up the leader block, and transports the leader block to the hub 44 via the roller guide 51, magnetic head assembly 54, and roller guides 52 and 53, and engages the leader block in the groove 44a of the hub 44.

Next, when a file reel motor (not shown) and the machine reel motor 43 are rotated in the same direction, the magnetic tape is delivered from the cartridge while being guided by the roller guides 51–53, and wound up on the hub 44. Further, data reading/writing is performed by the magnetic head assembly 54. Furthermore, rewinding of the magnetic tape is performed by reverse rotation of the file reel motor and the machine reel motor 43.

In accordance with the first embodiment of the present invention, the non-wrap portion of the magnetic tape does not receive any compressive force in an up and down direction from the upper flange unit 68 and the lower flange unit 63, and therefore the magnetic tape is not bent. Since the magnetic tape is not bent, read/write errors caused by poor contact of the magnetic tape with the magnetic head assembly 54, specifically the playback head unit 55 and recording head unit 56, are not generated in the neighborhood of the upper and lower tape edges.

Further, in accordance with the first embodiment of the present invention, each of the shaft 61 and the flanged tubular holder 67, the flanged tubular holder 67 and the upper flange unit 68, the convex portion 61B of the shaft 61 and the concave portion, and the like, are fitted together in a state in which relative motion is impossible. Furthermore, the upper flange unit and the lower flange unit are mounted in a state in which rotation relative to the shaft 61 is impossible. The roller guide may be set in a position in which relative motion is impossible by forming a flat surface parallel to a central axis of the shaft in the external circumference of the convex portion 61B. A concave portion, such as a hole, is disposed in the base to fit the convex portion 61B. Thus, in accordance with the first embodiment of the present invention, position setting of the roller guide is easily performed with a simple structure to achieve a state in which relative rotation is impossible. Furthermore, the design of the roller guide reduces the cost of the magnetic tape device.

In accordance with the first embodiment of the present invention, the convex portion 61B includes the small diameter cross section, and includes two flat surfaces parallel to the central shaft formed in the external circumference. However, the present invention is not limited to two flat surfaces in the convex portion. For example, there may be only one flat surface formed parallel to the central shaft in the external circumference of the convex portion, and in this case, the cross section of the convex portion becomes a "D" shape.

Moreover, in accordance with the first embodiment of the present invention, the shaft 61 includes a convex portion 61B used to set the shaft 61 in the base. However, the present invention is not limited to using the convex portion 61B to fix the shaft 61 to the base. For example, the shaft 61 may be fixed to the base with engagement pins for position setting, for example, protruding pins or the like, thereby eliminating the operation of cross sectional shaping of the convex portion 61B.

Furthermore, in accordance with the first embodiment of the present invention, the base may also include an engagement portion (for example, a hole) for setting a position of the roller guide which engages with the engagement portion of the shaft. Thus, in accordance with the first embodiment of the invention, the convex portion 61B of the shaft 61 fits into the concave portion of the base to set the shaft 61 into the base, and furthermore, by engaging a neighboring engagement portion of the base and the engagement portion of the shaft 61, position setting of the roller guide on the base is easily performed, and the design reduces the cost of the magnetic tape device.

Furthermore, a magnetic tape device usually has a plurality of roller guides respectively having different angles of wrap. However, the present invention is applicable to roller guides having different angles of wrap. For example, the present invention is applicable to a roller guide having a small angle of wrap, wherein sliding contact with the upper flange unit and the lower flange unit occurs in only the upper and lower edges of the wrap portion of the magnetic tape. Thus, a tape guide having a roller guide with an upper flange unit and a lower flange unit each having a concavity for avoiding sliding contact can be used as common components in roller guides having different angles of wrap. Accordingly, components of tape guides can be made common, and the design can reduce the cost of the magnetic tape device.

For example, when the angles of wrap on the roller guides 51, 52 and 53 are respectively a minimum $\theta_{51}$, $\theta_{52}$, $\theta_{53}$, the upper flange unit and lower flange unit which have been formed with concavities to avoid sliding contact when the angle of wrap is $\theta_{53}$, may also be used in the roller guides 51, 52 having respective angles of wrap of $\theta_{51}$, $\theta_{52}$, and the magnetic tape device can be designed using common components.

Second Embodiment of the Invention

The second embodiment of the present invention differs from the first embodiment of the invention in that the magnetic tape is guided during travel by a tape guide not only having roller guides, but by a tape guide comprising roller guides and guide posts. More particularly, in accordance with the second embodiment of the present invention, the magnetic tape device comprises tape guides including roller guides and guide posts which guide the magnetic tape as the magnetic tape travels past a magnetic head to perform reading/writing of data. Elements shown and described in accordance with the second embodiment of the present invention which are the same as or similar to the elements of the first embodiment are referred to by like reference numerals, and a detailed description of the like elements will not be repeated.

Figure 11:
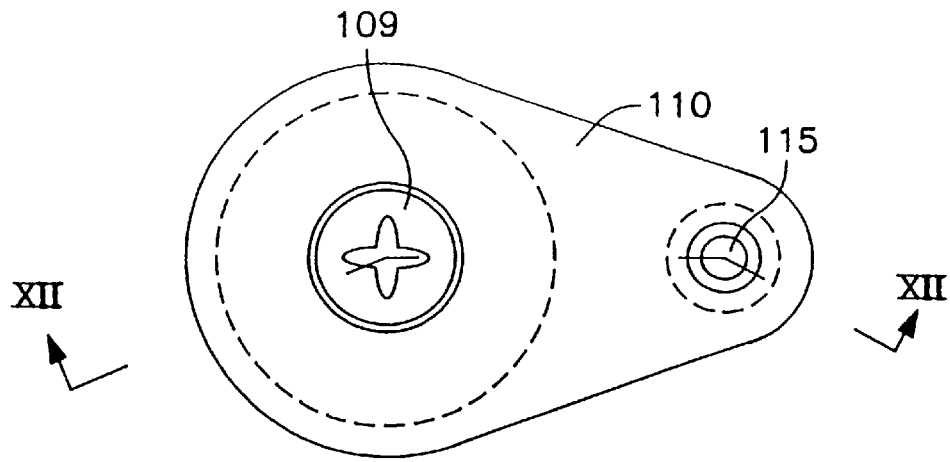
FIG. 11 is a plan view of a tape guide for a magnetic tape device in accordance with a second embodiment of the present invention.
Figure 12:
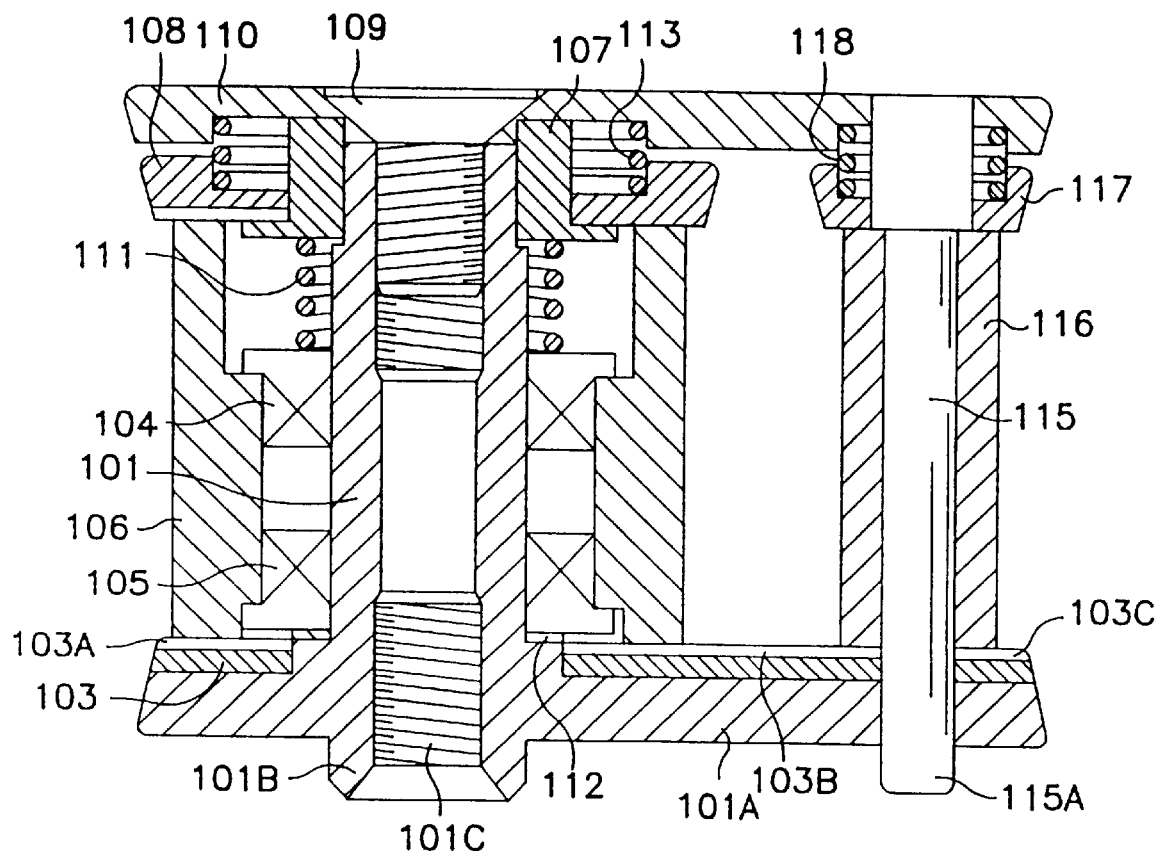
FIG. 12 is a cross sectional diagram across the sectional line XII—XII of FIG. 11 in accordance with the second embodiment of the present invention.

FIG. 11 is a plan view of a tape guide used in a magnetic tape device in accordance with a second embodiment of the present invention. FIG. 12 is a cross sectional diagram taken on the section line XII—XII of FIG. 11. In accordance with the second embodiment of the present invention, the roller guide portion of the tape guide has a structure similar to that of the roller guide shown in FIG. 4; however, the configurations of the shaft, the lower flange unit and the cap are different from those disclosed with respect to the first embodiment of the invention.

As shown in FIGS. 11 and 12, the roller guide comprises a shaft 101 set up on a base (not shown in the drawing). The shaft 101 is preferably made of a stainless steel material having excellent workability. However, other suitable materials can be used for the shaft 101. A support member 101A is integrally formed in the lower portion of the shaft 101. The support member 101A comprises a large diameter portion arranged concentrically with the shaft 101 body, and a small diameter portion located eccentrically of the shaft 101 body. A roller guide is formed in the large diameter portion of the support member 101A, and a guide post is formed in the small diameter portion of the support member lOlA. Furthermore, a convex portion of the shaft 101B is positioned concentrically with the shaft 101 body for setting the shaft 101 in the base, and is used during fixing of the tape guide to the base. A hole 101C is formed in a lower surface of the convex portion 101B into which a screw is inserted to fix the tape guide to the base.

A lower flange unit 103, made of ceramic or the like, is positioned on the support member 101A, and is used jointly as a lower flange unit of both the roller guide and the guide post. The lower flange unit 103 comprises a large diameter portion arranged concentrically with the shaft 101 body, and a small diameter portion located eccentrically of the shaft 101 body. The lower flange unit 103 is superposed on, and adhered to, the upper surface of the support member 101A.

The lower flange unit 103 is in sliding contact with the lower edge of the magnetic tape only at positions corresponding to wrap portions of the magnetic tape which contact an external circumference of a cylindrical roller unit 106 of the roller guide (described below), and a sliding contact portion 116 of a guide post (described below).

Figure 13:
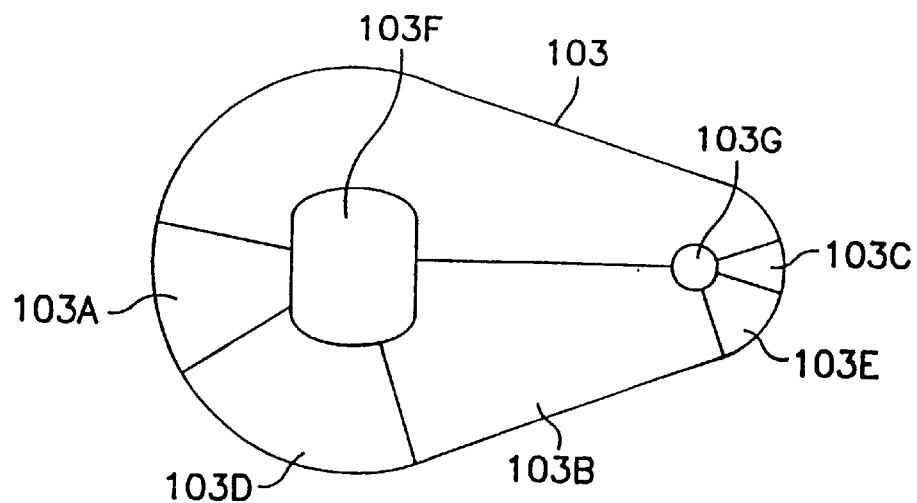
FIG. 13 is a diagram showing an upper surface of a lower flange unit shown in FIG. 11 in accordance with the second embodiment of the present invention.

As shown in FIG. 13, the lower flange unit 103 includes concavities 103A, 103B and 103C for avoiding sliding contact disposed in the portions of the upper surface of the lower flange unit 103 which are at risk of coming into contact with the non-wrap portions of the magnetic tape. Further, a convex region 103D toward the roller guide and a convex region 103E toward the guide post make sliding contact with only the respective wrap portions of the magnetic tape.

Moreover, a through hole 103F having a small diameter is formed in a center of the large diameter side of the lower flange unit 103. A portion of the shaft 101 fits into the through hole 103F to easily set the position of the lower flange unit 103 in the rotary direction of the shaft 101 at the time of the process of adhering the lower flange unit 103 to the support member 101A. The portion of the shaft 101 which fits into the through hole 103F is, of course, formed with a small diameter cross section.

The cylindrical roller unit 106 is supported coaxially with the shaft 101 in an intermediate portion of the shaft 101 by an upper bearing 104 and a lower bearing 105. An outer circumferential surface of the cylindrical roller unit 106 is in contact with the magnetic tape and rotates as the magnetic tape travels. Moreover, an upper flange unit 108 having a form similar to the upper flange unit 68 shown in FIGS. 7 and 8 is disposed on an upper portion of the shaft 101 fitted to a flanged cylindrical holder 107. The upper flange unit 108 is movable only in the shaft direction (i.e., the up and down direction).

In accordance with the second embodiment of the present invention, the flanged cylindrical holder 107 in the upper portion of the shaft 101 is fitted to be movable only in the up and down direction, and the upper flange unit 108 is fitted in the cylindrical portion of the holder 107 and is also movable only in the up and down direction (i.e., the shaft direction).

The upper portion of the shaft 101 is formed with a small cross section, and the upper portion of the shaft fits in a small diameter through hole of the flanged cylindrical holder 107. Moreover, a through hole in the center of the upper flange unit 108 also has a small diameter, and the cylindrical portion of the flanged cylindrical holder 107 which fits into the through hole in the center of the upper flange unit 108 is also of small diameter.

The upper flange unit 108 includes a concavity which is formed for avoiding sliding contact in the lower surface of the upper flange unit 108. More particularly, the upper flange unit 108 is formed so that sliding contact with the upper edge of the magnetic tape occurs in only the portion of the magnetic tape contacting the outer circumferential surface of the roller unit 106 (i.e., the wrap portion).

Furthermore, a cap 110 is fixed to the upper end of the shaft 101 with a small flat head screw (bolt) 109. Moreover, a compression coil spring 111 is inserted between an inner ring of the upper bearing 104 and the flanged cylindrical holder 107, and a ring 112 is inserted between an inner ring of the lower bearing 105 and the support member 101A of the shaft 101. The play in the shaft direction of the upper and lower bearings 104, 105 is taken up by the action of the compression coil spring 111, and the play of the roller unit 106 is taken up in the up and down direction.

A compression coil spring 113 is inserted between the upper flange unit 108 and the cap 110. The upper flange unit 108 is urged toward the lower flange unit 103 by the action of the compression coil spring 113. The magnetic tape which travels between the upper flange unit 108 and the lower flange unit 103 is normally pressed against the upper surface of the lower flange unit 103.

A through hole 103G (see FIG. 13) is formed in the center of the small diameter portion side of the lower flange unit 103. A through hole is also formed in the support member 101A of the shaft 101 corresponding to the through hole 103G. A guide post shaft member 115 fits into the through hole 103G and into the through hole in the support member 101A. The through hole in the center of the small diameter side of the support member 101A is drilled in a small diameter form, and the portion of the shaft member 115 which fits into the through hole, in order to perform position setting in the rotation direction of the shaft member 115, is formed of small diameter form in cross section. The lower end of the shaft member 115 projects from the support 101A, providing a convex portion 115A for setting the position of the tape guide in the base.

A cylindrical sliding contact portion 116 fits in an intermediate portion of the shaft 115 and includes an outer circumferential surface in sliding contact with the magnetic tape. An upper flange unit 117, movable in the shaft direction only, is disposed in an upper portion of the shaft member 115. A through hole in the upper flange unit 117 is formed with a small diameter, and an upper portion of the shaft unit 115 having a corresponding small diameter fits in the through hole.

The upper flange unit 117 is shaped similarly to the upper flange unit 108, and only the portion of the magnetic tape which contacts the outer circumferential surface of the sliding contact portion 116 (i.e., the wrap portion) is in sliding contact with the lower surface of the upper flange unit 117. A concavity for avoiding sliding contact in the non-wrap portions of the magnetic tape is formed in the lower edge of the upper flange unit 117.

Moreover, a compression coil spring 118 is inserted between the upper flange unit 117 and the cap 110. The upper flange unit 117 is urged toward the lower flange unit 103 by the action of the compression coil spring 118. The magnetic tape which travels between the upper flange unit 117 and the lower flange unit 103 is normally pressed against the upper surface of the lower flange unit 103.

Normally, the convex portion 101B for setting the tape guide in the base is disposed in the lower end of the shaft 101 of the roller guide portion of the tape guide, and a convex portion 115A for position setting is disposed at the lower end of the shaft 115 of the guide post portion of the tape guide. The convex portions 101B and 115A respectively fit with a concave portion for setting up use and a concave portion for positioning use disposed in the base, to effect position setting of the tape guide on the base.

Figure 14:
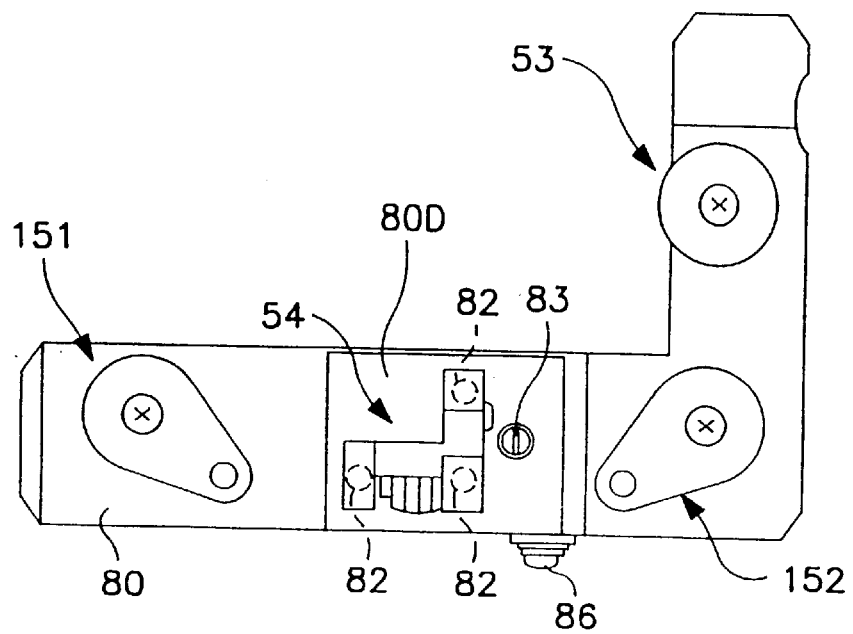
FIG. 14 is a plan view showing an example of the location of a tape guide and magnetic head assembly in accordance with the second embodiment of the present invention.
Figure 15:
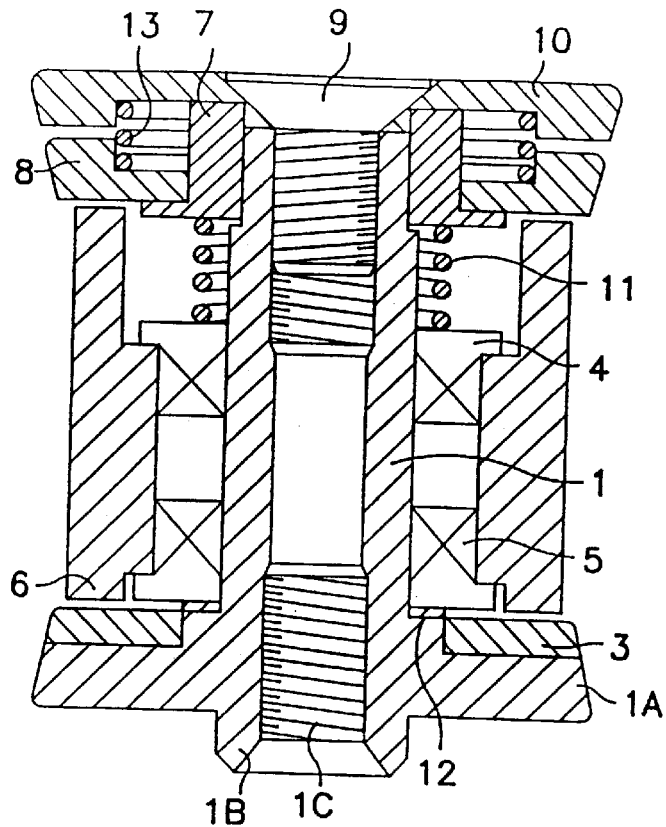
FIG. 15 is a cross sectional diagram of a roller guide used in a prior art magnetic tape device.
Figure 16:
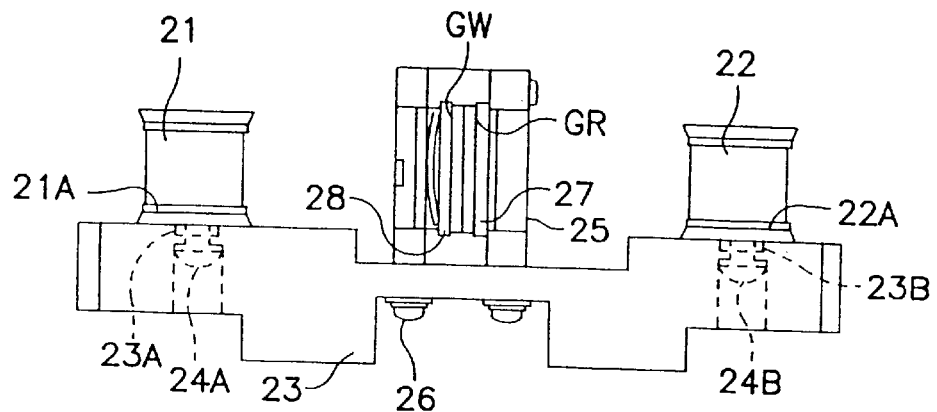
FIG. 16 is a diagram showing an example of the location of a magnetic head assembly and a roller guide used in a prior art magnetic tape device.

In accordance with the second embodiment of the present invention, the tape guides 151, 152 and magnetic head have the positional relationship shown in FIG. 14, which is a plan view of a tape guide and magnetic head assembly. In FIG. 14, the elements which are the same as those shown in FIG. 9 are referred to by the same reference numerals, and a detailed description of these like elements is omitted. As shown in FIG. 14, tape guides 151, 152 including guide posts are installed instead of the roller guides 51, 52 in FIG. 9. The respective guide posts of the tape guides 151, 152 are installed on the upstream and downstream sides of the magnetic head assembly 54, positioned to the sides of the magnetic head 54.

In accordance with the second embodiment of the present invention, the operation of a magnetic tape device is completely similar to operation of the first embodiment of the present invention.

In accordance with the second embodiment of the invention, the lower flange unit 103 serves as both the lower flange unit of the roller guide and the lower flange unit of the guide post. Accordingly, it is unnecessary to adjust the height of the respective upper surfaces of a pair of lower flange units, thus enabling a design which reduces the cost of the magnetic tape device. Furthermore, since the heights of the lower flange units coincide, the edge of the magnetic tape is not exposed to excessive forces caused by a difference in level of the flange units, and a design which reduces the cost of the magnetic tape device is enabled.

Furthermore, there is no bending (deformation) of the magnetic tape as a result of a difference in level between lower flange units. Accordingly, poor contact between the magnetic tape and the magnetic head is avoided, and reading/writing errors are not generated in the neighborhood of the upper and lower tape edges.

Moreover, in accordance with the second embodiment of the present invention, the roller guide and the guide post in the tape guide each include convex portions which avoid sliding contact disposed in the lower surface of the upper flange units 108, 117 and in the upper surface of the lower flange unit 103. Accordingly, only the wrap portion of the magnetic tape, which contacts the outer circumferential surface of roller unit 106 and cylindrical sliding contact portion 116, is in sliding contact with the upper flange units and lower flange units, at the upper and lower tape edges.

In accordance with the second embodiment of the present invention, the tape guide includes both a roller guide and a guide post including upper flange units 108, 117 and the lower flange unit 103 which prevent a compressive force from acting on non-wrap portions of the magnetic tape in an up and down direction. Accordingly, the magnetic tape does not bend as a result of the compressive force on the non-wrap portions.

Furthermore, in accordance with the second embodiment of the present invention, the contact between the magnetic tape and the magnetic head is not worsened by compressive forces, and reading/writing errors caused by the compressive force in the neighborhood of the upper and lower tape edges do not arise.

Furthermore, in accordance with the second embodiment of the present invention, the tape guide includes a convex portion 101B disposed in the lower end of the shaft 101 of the roller guide, and a convex portion 115A disposed in the lower end of the shaft member 115 of the guide post. Concave portions, into which the convex portions 101B and 115 respectively fit, are disposed in the base. By fitting together the convex and concave portions, position setting of the tape guide on the base is performed. Accordingly, position setting of the tape guide is easily performed, and the design reduces the cost of the magnetic tape device.

Moreover, the tape guides 151, 152 arranged as shown in FIG. 14 include respective tape guides positioned on the upstream and downstream sides of the magnetic head. The roller guides and guide posts may have different angles of wrap. For example, in a tape guide with a roller guide having a small angle of wrap, only the upper and lower edges of the wrap portion of the magnetic tape are in sliding contact with the upper flange unit 108 and the lower flange unit 103. However, a roller guide including the upper flange unit 108 and the lower flange unit 103 having concavities for avoiding sliding contact is used as a common component regardless of the angle of wrap, even in roller guides with a large angle of wrap. Furthermore, in a tape guide with guide posts having a small angle of wrap, the upper flange unit 117 and lower flange unit 103 are in sliding contact with only the upper and lower edges of the wrap portion of the magnetic tape. However, a guide post including the upper flange unit 117 and the lower flange unit 103 having concavities for avoiding sliding contact is used as a common component regardless of the angle of wrap even in guide posts having large or small angles of wrap. Accordingly, components of tape guides can be made common, and the design reduces the cost of the tape device.

In accordance with the second embodiment of the present invention, the upper flange unit 108 of the roller guide, and the upper flange unit 117 of the guide post are mounted movably in the up and down directions on respective shafts 101, 115. Further, the upper flange unit 108 and the upper flange unit 117 are urged in a downward direction by the respective coil springs 113, 118. However, if the lower surface of the upper flange unit is urged in at least one direction, the tape travel height can be kept constant.

In accordance with the second embodiment of the present invention, the position of the tape guide on the base is set using the convex portion 101B disposed at the lower end of the shaft 101 of the roller guide, and the convex portion 115A disposed at the lower end of the shaft member 115 of the guide post. However, the present invention is not limited to setting the position of the tape guide in this manner, and the various position setting structures described in accordance with the first embodiment of the invention may also be used.

As described hereinabove, in accordance with the first embodiment of the present invention, a concavity which avoids sliding contact with a magnetic tape is disposed in a lower surface of an upper flange unit and in an upper surface of the lower flange unit. Accordingly, only the upper and lower tape edges of a wrap portion of a magnetic tape, which is in contact with the outer circumferential surface of a roller unit, is in sliding contact with the upper flange and the lower flange unit.

Therefore, in accordance with the first embodiment of the present invention, the non-wrap portion of the magnetic tape does not receive any compressive force in an up and down direction from the upper flange unit and lower flange unit, and is not bent. As a result, reading and writing errors caused by poor contact of the magnetic tape and the magnetic head close to the upper and lower tape edges are not generated.

In accordance with the first embodiment of the present invention, the upper flange unit and the lower flange unit are mounted on a shaft in a state in which relative rotation is impossible. More particularly, a convex portion is disposed at the lower end of the shaft, parallel with the center axis of the shaft, having a flat face formed on its outer circumference. A concave portion is disposed in the base into which the convex portion of the shaft fits. By fitting the convex portion into the concave portion, position setting of a roller guide is easily performed, and the design reduces the cost of the magnetic tape device.

Moreover, in accordance with the first embodiment of the invention, the upper flange unit and lower flange unit are mounted such that rotation relative to the shaft is impossible. Further, an engagement unit may be disposed at a lower end of the shaft for setting the shaft in the base, and an engagement member is disposed in the base which engages the engagement unit of the shaft. The roller guide is mounted on the base by fitting the convex portion of the shaft into the convex portion of the base, and the engagement portions of the shaft and the base are engaged to set the position of the roller guide on the base. Accordingly, the position setting of the roller guide is easily performed and the design reduces the cost of the magnetic tape device.

In accordance with the first embodiment of the present invention, the magnetic tape device includes a plurality of roller guides respectively having different angles of wrap. However, the first embodiment of the present invention is applicable to a variety of roller guides, regardless of the angle of wrap, including roller guides having large and small angles of wrap. For example, in roller guides having a small of angle of wrap, wherein sliding contact with the upper flange unit and the lower flange unit occurs in only the wrap portion of the upper and lower edges of the magnetic tape, an upper flange unit and a lower flange unit having concavities for avoiding sliding contact can be used. Accordingly, if a magnetic tape device requires a plurality of tape guides including roller guides having different angles of wrap, the roller guide in accordance with the present invention can be used as a common component in the plurality of tape guides having different angles of wrap, thereby simplifying design and reducing the cost of the magnetic tape device.

In accordance with the second embodiment of the present invention, the tape guide comprises a roller guide and a guide post having a lower flange unit which are the same member. Accordingly, troublesome adjustments to match the height of the upper surfaces of both flange units are unnecessary. Further, since the height of the lower flange units coincides, the edge of the magnetic tape is not exposed to excessive forces as a result of differences in level and the design reduces the cost of the magnetic tape device.

Still further, since excessive forces are not exerted on the magnetic tape, the magnetic tape does not become bent, and reading and writing errors near the upper and lower edges of the tape, which are caused by poor contact of the magnetic tape and the magnetic head, do not occur.

In accordance with the second embodiment of the present invention, the upper flange unit of at least one of the roller guide and the guide post is mounted for movement in the up and down direction of the shaft and is urged downward with a coil spring. Accordingly, the tape travel height can be kept constant.

Moreover, in accordance with the second embodiment of the present invention, each of the lower surface of the upper flange unit and the upper surface of the lower flange unit of the roller guide include a concavity for avoiding sliding contact, such that the magnetic tape is in sliding contact with the upper flange unit and lower flange unit of the roller guide at only the upper and lower edges of the wrap portion of the magnetic tape which contacts the outer circumferential surface of the roller unit. Further, each of the lower surface of the upper flange unit and the upper surface of the lower flange unit of the guide post include a concavity for avoiding sliding contact, such that the magnetic tape is in sliding contact with the upper flange unit and the lower flange unit of the guide post at only the upper and lower edges of the wrap portion of the magnetic tape which contacts the outer circumferential surface of the guide post. Accordingly, by providing concavities for avoiding sliding contact in each of the lower surface of the upper flange unit and the upper surface of the lower flange unit in both the roller guide and the guide post, the non-wrap portion of the magnetic tape does not receive compressive forces in the up and down direction from the upper flange unit and lower flange unit, and does not bend. Therefore, poor contact of the magnetic tape with the magnetic head as a result of compressive forces is eliminated, and reading/writing errors close to the tape edges do not occur.

Moreover, in accordance with the second embodiment of the present invention, the lower end of the roller guide shaft includes a convex portion for setting the tape guide in the base, and the lower end of the guide post shaft includes a convex portion for setting the tape guide in the base. The base includes a concave portion which fits with the convex portion of the roller guide shaft, and the base includes a concave portion which fits with the convex portion of the guide post shaft. Accordingly, by interfitting of concave portions of the base with the convex portions of the roller guide shaft and guide post shaft, position setting of the tape guide on the base is easily performed, and the design reduces the cost of the magnetic tape device.

In accordance with the second embodiment of the present invention, the magnetic tape device comprises a plurality of tape guides, each including a roller guide and guide post, positioned on the upstream side and the downstream side of the magnetic head to guide the magnetic tape toward the magnetic head. The roller guides and guide posts of the tape guides may have different angles of wrap. For example, in a roller guide with a small angle of wrap, the upper flange unit and the lower flange unit are in sliding contact with the magnetic tape only at the upper and lower tape edges of the wrap portion of the magnetic tape which contacts the outer circumferential surface of the roller unit. However, the second embodiment of the present invention is applicable to a variety of roller guides, regardless of whether the angle of wrap is large or small. More particularly, a tape guide having a roller unit and a guide post with an upper flange unit and lower flange unit each having concavities for avoiding sliding contact can be used with a roller guide having a large angle of wrap and a guide post having a large angle of wrap, as well as with a roller guide having a small angle of wrap and a guide post having a small angle of wrap. Therefore, the tape guide in accordance with the second embodiment of the present invention can be used as a common component in a magnetic tape device, regardless of the angle of wrap, thereby simplifying design and reducing the cost of the magnetic tape device.

Although a few preferred embodiments of the present invention have been shown and described, it will be appreciated by those skilled in the art that changes may be made in the embodiments without departing from the principles and spirit of the invention, the scope of which is defined in the appended claims and their equivalents.

What is claimed is:

1. A tape guide, suitable for use in a magnetic tape device, to guide a magnetic tape as the magnetic tape travels past a magnetic head performing reading and writing of data with respect to the magnetic tape, comprising:
   a roller guide, including
      a shaft mountable on a base;
      an upper flange unit disposed on an upper portion of the shaft, and movable in an up and down direction, the upper flange unit having a lower surface in sliding contact with an upper edge of the magnetic tape;
      a lower flange unit disposed on a lower portion of the shaft, the lower flange unit having an upper surface in sliding contact with a lower edge of the magnetic tape; and
      a roller unit having the magnetic tape wrapped on an outer circumferential surface, wherein the roller unit is coaxial with the shaft between the upper flange unit and the lower flange unit, and rotates accompanying the travel of the magnetic tape,
      wherein the lower surface of the upper flange unit and the upper surface of the lower flange unit each include a concavity to avoid sliding contact with the magnetic tape, and the upper flange unit and the lower flange unit are in sliding contact with only an upper edge and a lower edge of a portion of the magnetic tape contacting the outer circumferential surface of the roller unit.

2. A tape guide as recited in claim 1, wherein the shaft includes a convex portion on a lower end, the convex portion having a flat outer circumferential surface, to mount the shaft,
   and the base includes a concave portion to fit the convex portion of the shaft, and a position of the tape guide on the base is set by fitting of the convex portion of the shaft into the concave portion of the base.

3. A tape guide as recited in claim 2, wherein the shaft includes an engagement unit to mount the shaft, and the base includes an engagement unit to engage the engagement unit of the shaft,
   wherein the engagement unit of the shaft engages the engagement unit of the base to set the position of the tape guide on the base.

4. A tape guide as recited in claim 1, wherein the tape guide includes a plurality of roller guides having different angles of wrap of the magnetic tape on the outer circumferential surface of the respective roller units.

5. A tape guide, suitable for use in a magnetic tape device, to guide a magnetic tape as the magnetic tape travels past a magnetic head performing reading and writing of data with respect to the magnetic tape, comprising:
   a roller guide, including
      a roller guide shaft,
      a roller guide upper flange unit disposed on an upper portion of the roller guide shaft in sliding contact with an upper edge of the magnetic tape,
      a roller guide lower flange unit disposed on a lower portion of the shaft in sliding contact with a lower edge of the magnetic tape, and
      a roller unit located coaxially with the roller guide shaft between the roller guide upper flange unit and the roller guide lower flange unit, and rotating accompanying the travel of the magnetic tape wrapped on an outer circumferential surface;
   a guide post, including
      a guide post shaft,
      an guide post upper flange unit disposed on an upper portion of the guide post shaft having a lower surface in sliding contact with the upper edge of the magnetic tape,
      a guide post lower flange unit disposed on a lower portion of the guide post shaft having an upper surface in sliding contact with the lower edge of the magnetic tape, and
      a sliding contact member located coaxially with the guide post shaft between the upper flange unit and the guide post lower flange unit, in sliding contact with a portion of the magnetic tape wrapped on an outer circumferential surface,
      wherein the roller guide lower flange unit and the guide post lower flange unit are the same member.

6. A tape guide as recited in claim 5, wherein at least one of the roller guide and guide post further comprise a coil spring, and the upper flange unit of at least one of the roller guide and guide post is movable in an up and down direction on the shaft and is urged downward by the coil spring.

7. A tape guide as recited in claim 5, wherein the roller guide upper flange unit includes a concavity in a lower surface to avoid sliding contact with the magnetic tape, and the roller guide lower flange unit includes a concavity in an upper surface to avoiding sliding contact with the magnetic tape, and the roller guide upper flange unit and the roller guide lower flange unit are in sliding contact with only upper and lower edges of a portion of the magnetic tape contacting an outer circumferential surface of the roller unit, and
   the guide post upper flange unit includes a concavity in a lower surface to avoid sliding contact with the magnetic tape, and the guide post lower flange unit includes a concavity in an upper surface to avoid sliding contact with the magnetic tape, and the guide post upper flange unit and the guide post lower flange unit are in sliding contact with only the upper and lower edges of a portion of the magnetic tape contacting an outer circumferential surface of the sliding contact member.

8. A tape guide as recited in claim 5, wherein the roller guide shaft includes a convex portion on a lower end mountable on a base, and the guide post shaft includes a convex portion on a lower end mountable on a base, and
   the base includes a first concave portion fitting with the convex portion of the roller guide shaft, and a second concave portion fitting with the convex portion of the guide post shaft.

9. A tape guide as recited in claim 7, wherein the tape guide comprises a plurality of the roller guides and the guide posts having different angles of wrap of the magnetic tape on the outer circumferential surface of the respective roller units and the sliding contact members.

10. A tape guide, suitable for use in a magnetic tape device, comprising:
    a roller unit having an outer circumferential surface contacting the tape and rotating accompanying movement of the tape; and
    a roller unit flange unit having a surface in sliding contact with an edge of the tape, the roller unit flange unit including a concave portion in the surface in sliding contact with the edge of the tape to prevent contact with the edge of the tape.

11. A tape guide as recited in claim 10, wherein the roller unit flange unit is in sliding contact with an edge of the tape corresponding to the portion of the tape contacting the outer circumferential surface of the roller unit, and the concave portion of the flange unit is located adjacent to the edge in sliding contact with the flange unit.

12. A tape guide as recited in claim 10, further comprising:
   a guide unit having an outer surface in sliding contact with the tape; and
   a guide unit flange unit having a surface in sliding contact with an edge of the tape, the guide unit flange unit including a concave portion in the surface in sliding contact with the edge of the tape to prevent contact with the edge of the tape.

13. A tape guide as recited in claim 10, further comprising:
   a guide unit to guide the tape, the guide unit including
      a sliding contact member in sliding contact with a portion of the magnetic tape wrapped on an outer cicumferential surface; and
      a guide unit flange unit having a surface in sliding contact with an edge of the tape,
   wherein the roller unit flange unit and the guide unit flange unit are the same member.

14. A tape guide as recited in claim 10, wherein the roller unit flange unit comprises:
   a roller unit upper flange unit having a surface in sliding contact with an edge of the tape, the roller unit upper flange unit including a concave portion in the surface in sliding contact with the edge of the tape; and
   a roller unit lower flange unit having a surface in sliding contact with an edge of the tape, the roller unit lower flange unit having a concave portion in the surface in sliding contact with the edge of the tape,
   wherein the roller unit is between the roller unit upper flange unit and the roller unit lower flange unit, and the concave portions prevent sliding contact with the edges of the tape.

15. A tape guide as recited in claim 14, further comprising:
   a guide unit to guide the tape, the guide unit including
      a sliding contact member in sliding contact with a portion of the magnetic tape wrapped on an outer cicumferential surface; and
      a guide unit flange unit having a surface in sliding contact with an edge of the tape, the guide unit flange unit including a concave portion in the surface in sliding contact with the edge of the tape to prevent contact with the edge of the tape.

16. A tape guide as recited in claim 15, wherein the guide unit flange unit comprises:
   a guide unit upper flange unit having a surface in sliding contact with an edge of the tape, the guide unit upper flange unit including a concave portion in the surface in sliding contact with the edge of the tape; and
   a guide unit lower flange unit having a surface in sliding contact with an edge of the tape, the guide unit lower flange unit having a concave portion in the surface in sliding contact with the edge of the tape,
   wherein the guide unit is between the guide unit upper flange unit and the guide unit lower flange unit, and the concave portions prevent sliding contact with the edges of the tape.

17. A tape guide as recited in claim 16, further comprising:
   a first coil spring to urge the roller unit upper flange unit downward, wherein the roller unit upper flange unit is movable in an up and down direction; and
   a second coil spring to urge the guide unit upper flange unit downward, wherein the guide unit upper flange unit is movable in an up and down direction.

18. A tape guide as recited in claim 16, wherein the roller unit lower flange unit and the guide unit lower flange unit are the same member.

19. A tape guide as recited in claim 10, further comprising:
   a coil spring to urge the roller unit flange unit downward, wherein the roller unit flange unit is movable in an up and down direction.

20. A guide unit as recited in claim 10, wherein the flange unit comprises:
   a first concave portion in a first portion of the surface in sliding contact with the edge of the tape; and
   a second concave portion in a second portion of the surface in sliding contact with the edge of the tape,
   wherein the first and second concave portions are positioned on opposite sides of a portion of the roller unit flange unit contacting the edge of the tape corresponding to the portion of the tape contacting the outer circumferential surface of the roller unit.

21. A magnetic tape device, comprising:
   a magnetic head to read data from and write data to a magnetic tape;
   a transfer device to move the magnetic tape past the magnetic head; and
   a roller unit to guide the magnetic tape as the magnetic tape travels past the magnetic bead, the roller unit including a flat surfaced flange in sliding contact with an edge of the magnetic tape, the flange having a concave portion in the flat surface in sliding contact with the edge of the magnetic tape to prevent contact with the edge of the tape.

22. A magnetic tape device as recited in claim 21, wherein the roller unit includes an upper flange in contact with an upper edge of the magnetic tape and a lower flange in sliding contact with a lower edge of the magnetic tape, and the upper flange and the lower flange each include a concave portion in the respective surfaces in sliding contact with the edge of the magnetic tape.

23. A magnetic tape device as recited in claim 21, wherein the magnetic tape device comprises a plurality of roller units to guide the magnetic tape.

24. A magnetic tape device as recited in claim 21, further comprising:
   a base; and
   a cylindrical shaft mounted on the base,
   wherein the roller unit is supported coaxially on the shaft.

25. A magnetic tape device as recited in claim 21, wherein the flange is movable in an up and down direction.

26. A magnetic tape device as recited in claim 21, wherein the flange is formed of a ceramic material.

27. A magnetic tape device as recited in claim 21, wherein the flange has a convex portion and a plurality of concave portions in the surface in sliding contact with the edge of the magnetic tape.

28. A magnetic tape device, comprising:
   a magnetic head to read data from and write data to a magnetic tape;
   a transfer device to move the magnetic tape past the magnetic head; and
   a guide unit to guide the magnetic tape as the magnetic tape travels past the magnetic head, the guide unit including a roller having a lower flange in sliding contact with an edge of the magnetic tape, the lower flange having a concave portion, and a guide having a lower flange in sliding contact with an edge of the magnetic tape, the lower flange having a concave portion.

29. A magnetic tape device as recited in claim 28, wherein the lower flanges of the roller and the guide are provided as a single unit having a large diameter portion in the vicinity of the roller and a small diameter portion in the vicinity of the guide.

30. A magnetic tape device as recited in claim 29, wherein the single unit is formed of a ceramic material.

31. A magnetic tape device as recited in claim 29, wherein the single unit has a plurality of concave portions and a plurality of convex portions, with each convex portion being adjacent to two concave portions.

32. A magnetic tape device as recited in claim 28, wherein the roller and guide each have an upper flange with a surface in sliding contact with an upper edge of the magnetic tape, the upper flanges respectively including concave portions provided in the respective surfaces in sliding contact with the upper edge of the magnetic tape.

33. A magnetic tape device as recited in claim 32, wherein the upper flanges are moveable in an up and down direction, respectively away from and towards the lower flanges.

34. A magnetic tape device as recited in claim 32, wherein the roller and guide each have a spring member to bias the respective upper flange towards the lower flange.

* * * * *